United States Patent
Beall et al.

(10) Patent No.: US 9,701,573 B2
(45) Date of Patent: Jul. 11, 2017

(54) HIGH STRENGTH GLASS-CERAMICS HAVING LITHIUM DISILICATE AND BETA-SPODUMENE STRUCTURES

(71) Applicant: CORNING INCORPORATED, Corning, NY (US)

(72) Inventors: George Halsey Beall, Big Flats, NY (US); Qiang Fu, Painted Post, NY (US); Lisa Anne Moore, Corning, NY (US); Linda Ruth Pinckney, Pittsford, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 26 days.

(21) Appl. No.: 14/474,708

(22) Filed: Sep. 2, 2014

(65) Prior Publication Data

US 2015/0274581 A1 Oct. 1, 2015
US 2016/0152512 A9 Jun. 2, 2016

Related U.S. Application Data

(60) Provisional application No. 61/970,566, filed on Mar. 26, 2014, provisional application No. 61/874,870, filed on Sep. 6, 2013.

(51) Int. Cl.
C03C 10/04 (2006.01)
C03C 10/12 (2006.01)
(Continued)

(52) U.S. Cl.
CPC .......... *C03C 10/0027* (2013.01); *C03C 3/093* (2013.01); *C03C 3/097* (2013.01); *C03C 10/0054* (2013.01); *C03C 2204/00* (2013.01)

(58) Field of Classification Search
CPC ..................... C03C 10/0009; C03C 10/0027
See application file for complete search history.

(56) References Cited

U.S. PATENT DOCUMENTS 5,219,799 A 6/1993 Beall et al.
5,691,256 A 11/1997 Taguchi et al.
(Continued)

FOREIGN PATENT DOCUMENTS

JP 09035234 * 2/1997
JP 2000143290 * 5/2000
(Continued)

OTHER PUBLICATIONS

European Patent Office; International Search Report; Mailing Date: Jan. 5, 2015; pp. 1-4.
(Continued)

*Primary Examiner* — Karl Group

(57) ABSTRACT

Glass and glass ceramic compositions having a combination of lithium disilicate and β-spodumene crystalline phases along with methods of making the glass and glass ceramic compositions are described. The compositions are compatible with conventional rolling and float processes and have high mechanical strength and fracture resistance. Further, the compositions are able to be chemically tempered to even higher strength glass ceramics that are useful as large substrates in multiple applications.

15 Claims, 21 Drawing Sheets

(51) Int. Cl.
*C03C 10/00* (2006.01)
*C03C 3/097* (2006.01)
*C03C 3/093* (2006.01)

(56) References Cited

U.S. PATENT DOCUMENTS

| | | | | |
|---|---|---|---|---|
| 6,048,589 | A | * | 4/2000 | Suzuki .............. C03C 10/0027 427/129 |
| 6,455,451 | B1 | | 9/2002 | Brodkin et al. |
| 6,458,728 | B1 | * | 10/2002 | Nagata .................. C03C 3/097 428/846 |
| 6,802,894 | B2 | * | 10/2004 | Brodkin ................ C03B 19/06 106/35 |
| 8,592,330 | B2 | * | 11/2013 | Johannes ............... C03C 3/085 106/35 |
| 9,260,342 | B2 | * | 2/2016 | Borczuch-Laczka ............... A61K 6/0235 |
| 2008/0248316 | A1 | | 10/2008 | Goto et al. |
| 2011/0030423 | A1 | * | 2/2011 | Johannes ............... C03C 3/085 65/21.5 |
| 2014/0045674 | A1 | * | 2/2014 | Johannes ............... C03C 3/085 501/17 |
| 2014/0141960 | A1 | | 5/2014 | Borczuch-Laczka et al. |
| 2015/0183681 | A1 | * | 7/2015 | Johannes ............... C03C 3/085 65/33.4 |

FOREIGN PATENT DOCUMENTS

| | | | |
|---|---|---|---|
| JP | 2001019469 | * | 1/2001 |
| JP | 2001019482 | * | 1/2001 |
| JP | 2001019488 | * | 1/2001 |
| WO | 2012/143137 A1 | | 10/2012 |
| WO | 2014/120628 | | 8/2014 |

OTHER PUBLICATIONS

U.S. Appl. No. 61/888,617; Beunet, L. J. M., et al.; "Crack-Resistant Glass-Ceramic Articles and Methods for Making the Same," Oct. 2013; 38 pages.

U.S. Appl. No. 62/018,936; Beall, G. H., et al.; "White, Opaque, β-Spodumene Glass-Ceramic Articles With Inherent Damage Resistance and Methods for Making the Same;" Jun. 2014; 34 pages.

* cited by examiner $Li_2O \cdot SiO_2 - Li_2O \cdot Al_2O_3 \cdot 4SiO_2 - SiO_2$

HIGH STRENGTH GLASS-CERAMICS HAVING LITHIUM DISILICATE AND BETA-SPODUMENE STRUCTURES

CROSS REFERENCES TO RELATED APPLICATIONS

This application claims the benefit of priority under 35 U.S.C. §119 to U.S. Provisional Application Ser. No. 61/970,566, filed on Mar. 26, 2014 and U.S. Provisional Application Ser. No. 61/874,870, filed on Sep. 6, 2013 the content of all of which is relied upon and incorporated herein by reference in its entirety.

BACKGROUND

Field

Embodiments relate to glass and glass ceramic compositions and in particular, to glass ceramic compositions having a combination of lithium disilicate and β-spodumene crystalline phases that are compatible with conventional rolling, float and blow molding processes.

Technical Background

Lithium disilicate glass-ceramics in the $SiO_2$—$Li_2O$—$K_2O$—$ZnO$—$P_2O_5$—$Al_2O_3$—$ZrO_2$ system have been developed and sold for use as dental crowns, bridges, and overlays. Their microstructures of interlocking tabular crystals provide high mechanical strength and fracture toughness and excellent chemical durability. Compositions in this area were invented at Corning, Inc. and patented by Beall et al. in U.S. Pat. No. 5,219,799 ("the '799 patent"). The composition of Example 3 from the '799 patent is given in Table 1 as composition A.

TABLE 1

| Wt % | A |
|---|---|
| $SiO_2$ | 74.3 |
| $Al_2O_3$ | 3.6 |
| $Li_2O$ | 15.4 |
| $K_2O$ | 3.3 |
| $P_2O_5$ | 3.4 |

While lithium disilicate glass ceramics such as composition A provide excellent mechanical properties, their precursor glasses are very fluid and difficult to adapt to many forming processes other than casting. Such glasses can have liquidus viscosities of 500-750 poise. For comparison, typical floated, rolled, press, or blow molded soda lime glasses, as well as rolled beta-quartz-based glass ceramics (used for cooktops), have liquidus viscosities approaching 10,000 poise. It would be very desirable to increase the viscosity of the precursor glass while retaining the good mechanical properties of a glass ceramic with lithium disilicate as a major phase.

In addition, known glass-based materials often exhibit intrinsic brittleness or low resistance to crack propagation. For example, an inherently low fracture toughness (e.g., 0.5-1.0 $MPa \cdot M^{1/2}$ for oxide glass and glass ceramics) makes oxide glass sensitive to the presence of small defects and flaws. As a comparison point, commercially available single-crystal substrates exhibit a fracture toughness value in the range from about 2.4 to about 4.5 $MPa \cdot M^{1/2}$. Chemical strengthening by, for example, ion exchange processes can provide some resistance to crack penetration at the surface of a glass or glass ceramic by imposing a compressive stress layer in the glass or glass ceramic to a depth (e.g., 50-100 μm) from the surface; however, the crack penetration resistance may be limited and is no longer effective once a crack propagates through the compressive stress layer into the bulk of the glass or glass ceramic. Improvement of the mechanical properties of glass-based materials, in particular with respect to damage resistance and fracture toughness, is an ongoing focus. Accordingly, it would also be very desirable to provide glass ceramics with improved damage resistance and fracture toughness.

BRIEF SUMMARY

A first aspect comprises a glass ceramic comprising 30-65 wt % of a lithium disilicate first crystalline phase, and 20-60 wt % of a β-spodumene second crystalline phase. In some embodiments, the glass ceramic comprises 40-55 wt % of a lithium disilicate first crystalline phase, and 25-45 wt % of a β-spodumene second crystalline phase. In some embodiments, the residual glass phase in the glass ceramic comprises less than 25 wt %.

In some embodiments, the glass ceramic has a composition comprising, in wt %:
$SiO_2$: 68-82%
$Al_2O_3$: 5-12.5%
$Li_2O$: 8-15%
$Na_2O$: 0-5%
$K_2O$: 0-5%
($Na_2O+K_2O$): 0-5%
$P_2O_5$: >0-4%
$ZrO_2$: 0-10%
TiO2: 0-4%.

In some embodiments, the glass ceramic has a composition comprising, in wt %:
$SiO_2$: 75-80%
$Al_2O_3$: 6-9%
$Li_2O$: 10-13%
$Na_2O$: 0-2.5%
$K_2O$: 0-3%
($Na_2O+K_2O$): 1-3%
$P_2O_5$: 1-3%
$ZrO_2$: 0-5%.

In some embodiments, the glass ceramic has a composition comprising, in wt %:
$SiO_2$: 68-82%
$Al_2O_3$: 5-12.5%
$Li_2O$: 8-15%
$B_2O_3$: 2-12%
$Na_2O$: 0-5%
$K_2O$: 0-5%
($Na_2O+K_2O$): 0-5%
$P_2O_5$: >0-4%
$ZrO_2$: 0-10%.

In some embodiments, the glass ceramic has a composition comprising, in wt %:
$SiO_2$: 70-80%
$Al_2O_3$: 6-9%
$Li_2O$: 10-13%
$B_2O_3$: 2.5-7.5%
$Na_2O$: 0-2.5%
$K_2O$: 0-3%
($Na_2O+K_2O$): 1-3%
$P_2O_5$: 1-3%
$ZrO_2$: 0-5%.

In some embodiments, the glass ceramic compositions above further include from about 2% to about 12% $B_2O_3$.

In some embodiments, the glass ceramic compositions above have a coefficient of thermal expansion greater than 5 ppm/° C. In some embodiments, the glass ceramics above have a fracture toughness of about 2 MPa·M$^{1/2}$ or greater. Fracture toughness commonly refers to the resistance of a material to crack propagation. In some embodiments, the glass ceramics above have a Vickers indentation crack initiation load of about 15 kgf or greater.

In some embodiments, the glass ceramics above are formed from a base glass having a liquidus viscosity greater than 1000 P.

In some embodiments, the glass ceramics above further comprise, in wt %:
$TiO_2$: >0-3%, and
$ZrO_2$: >0-4.

In some embodiments, the glass ceramics above further comprise a coloring component. The coloring component may comprise $V_2O_5$, $Cr_2O_3$, $TiO_2$, $MnO_2$, NiO, ZnO, CuO, NiO, $Co_3O_4$, rare earth oxides, and combinations thereof. In some cases, the total wt % of coloring component is from >0 to about 4 wt %.

The glass ceramics of one or more embodiments may exhibit a substantially white color or substantially black color. In some embodiments, the glass ceramics exhibit a color presented in CIELAB color space coordinates determined from reflectance spectra measurements using a spectrophotometer, with illuminant D65 and specular reflectance excluded, of the following ranges: a*=from about −1 to about +3; b*=from about −7 to about +3; and L*>85.

A second aspect comprises a method of forming one of the glass ceramics above by forming a glass composition, and ceramming the glass composition.

Embodiments of the glass ceramics may be ion exchanged. In some embodiments, the glass ceramic is ion exchanged to a depth of layer of at least about 10 µm. In some embodiments, the glass or glass ceramic is ion exchanged to a depth of layer of at least about 20 µm. In other embodiments, the glass ceramic is ion exchanged to a depth of layer of at least about 40 µm. In some embodiments, the glass ceramic has a compressive stress layer extending from a surface of the glass ceramic to the depth of layer, and wherein the compressive stress layer is under a compressive stress of at least about 100 MPa, at least about 200 MPa or at least about 300 MPa. In other embodiments, the glass ceramic has a compressive stress layer extending from a surface of the glass ceramic to the depth of layer, and wherein the compressive stress layer is under a compressive stress of up to about 500 MPa. In other embodiments, the glass ceramic has a compressive stress layer extending from a surface of the glass ceramic to the depth of layer, and wherein the compressive stress layer is under a compressive stress of up to about 750 MPa. In some embodiments, the ion exchanged glass ceramic has a Vickers indentation crack initiation load of at least about 7 kgf. As used herein, Vickers indentation crack initiation load refers to a material's ability to resist radial crack initiation under a Vickers indenter tip at a certain load. In still other embodiments, the ion exchanged glass ceramic has a Vickers indentation crack initiation load of at least about 15 kgf. In other embodiments, the ion exchanged glass ceramic has a Vickers indentation crack initiation load of at least about 20 kgf.

These and other aspects, advantages, and salient features will become apparent from the following detailed description, the accompanying drawings, and the appended claims.

FIGURES

FIG. 1A is a $Li_2O$—$Al_2O_3$—$SiO_2$ phase diagram. The oval indicates the composition area which yields stable glasses and glass-ceramics comprising lithium disilicate and β-spodumene crystalline phases. The triangle indicates the portion of the diagram shown in FIG. 1B.

FIG. 1B is part of a $Li_2$—$Al_2O_3$—$SiO_2$ phase diagram showing pseudo-ternary $Si_2$—$Li_2O.SiO_2$—$Li_2O.Al_2O_3.4SiO_2$. The shaded area indicates the compositional area for stable glasses with liquidus temperatures of 1150° C. or lower and which yield glass ceramics comprising lithium disilicate and β-spodumene.

FIG. 2 presents high temperature viscosity curves of composition A (Table 1), composition MX (Table 3), and a representative soda lime glass. The circles represent liquidus temperatures for each glass.

Figure 5A:
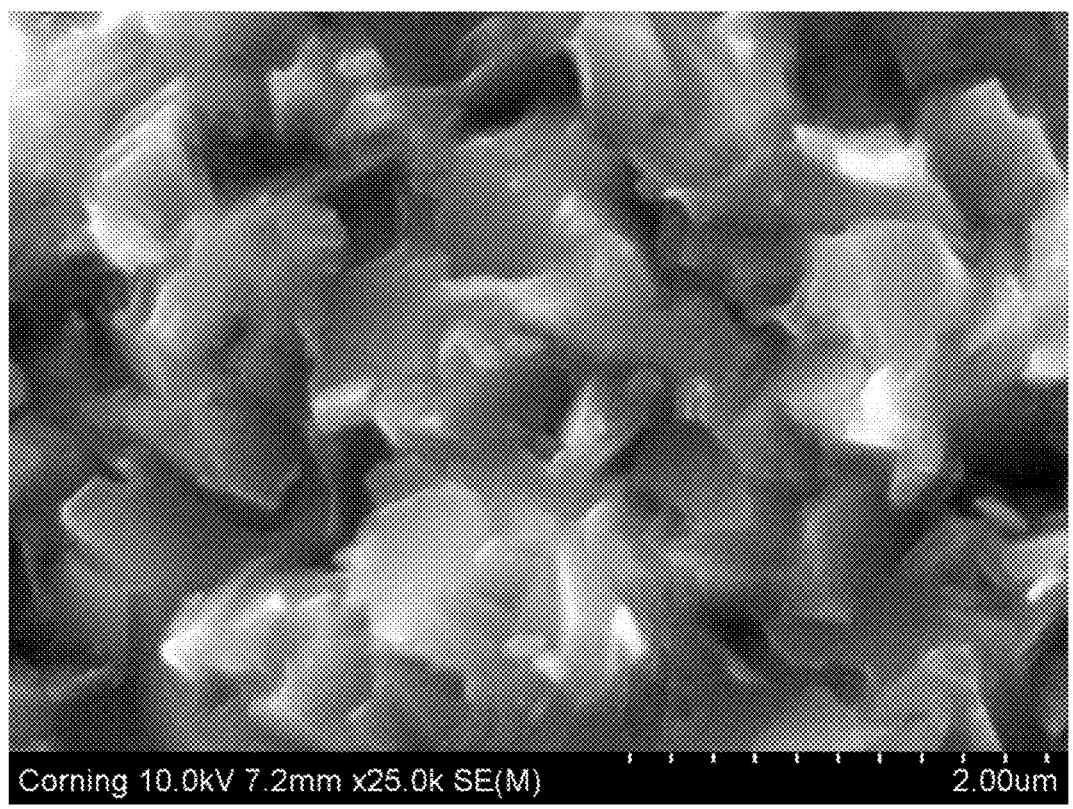
Figure 5B:
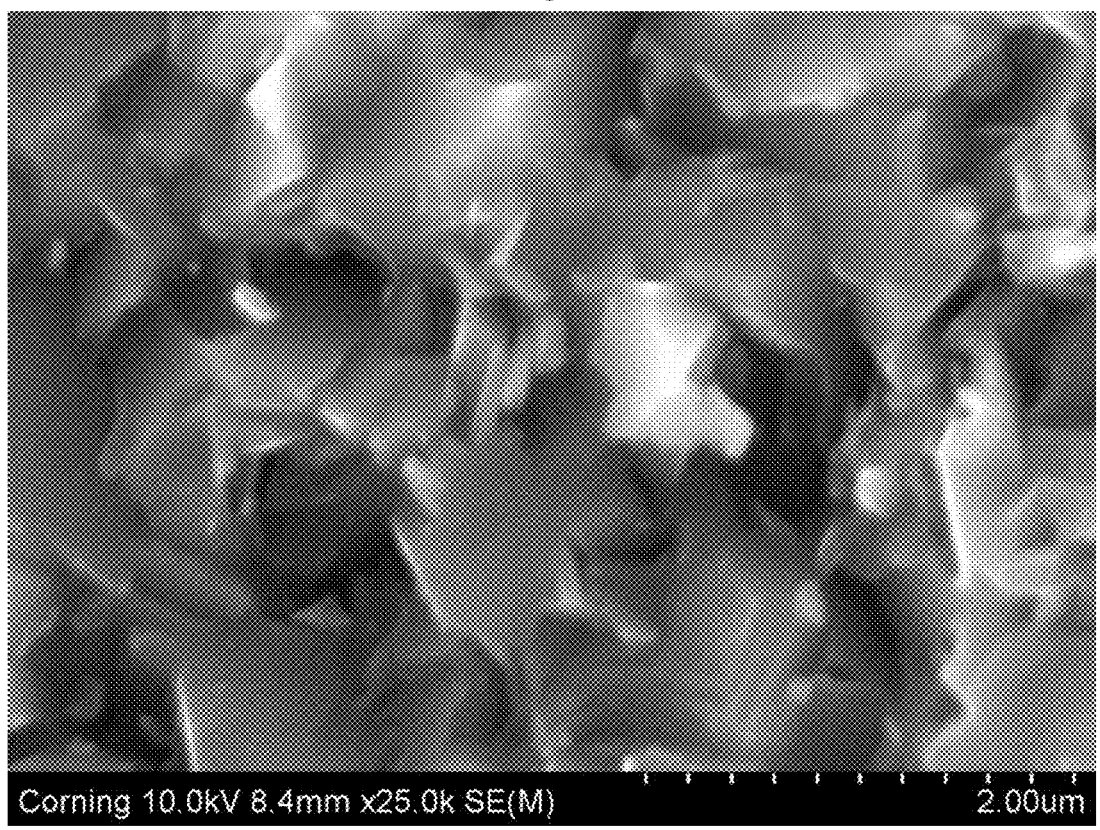

FIG. 5A and FIG. 5B shows scanning electron microscopy (SEM) images of glass ceramic compositions. FIG. 5A is composition A, heat treated at 750° C. for two hours and 850° C. for four hours and having a lithium disilicate crystalline phase. FIG. 5B is composition KN (Table 3), heat treated at 750° C. for two hours and 850° C. for four hours and having lithium disilicate and ⍰-spodumene crystalline phases.

Figure 6A:
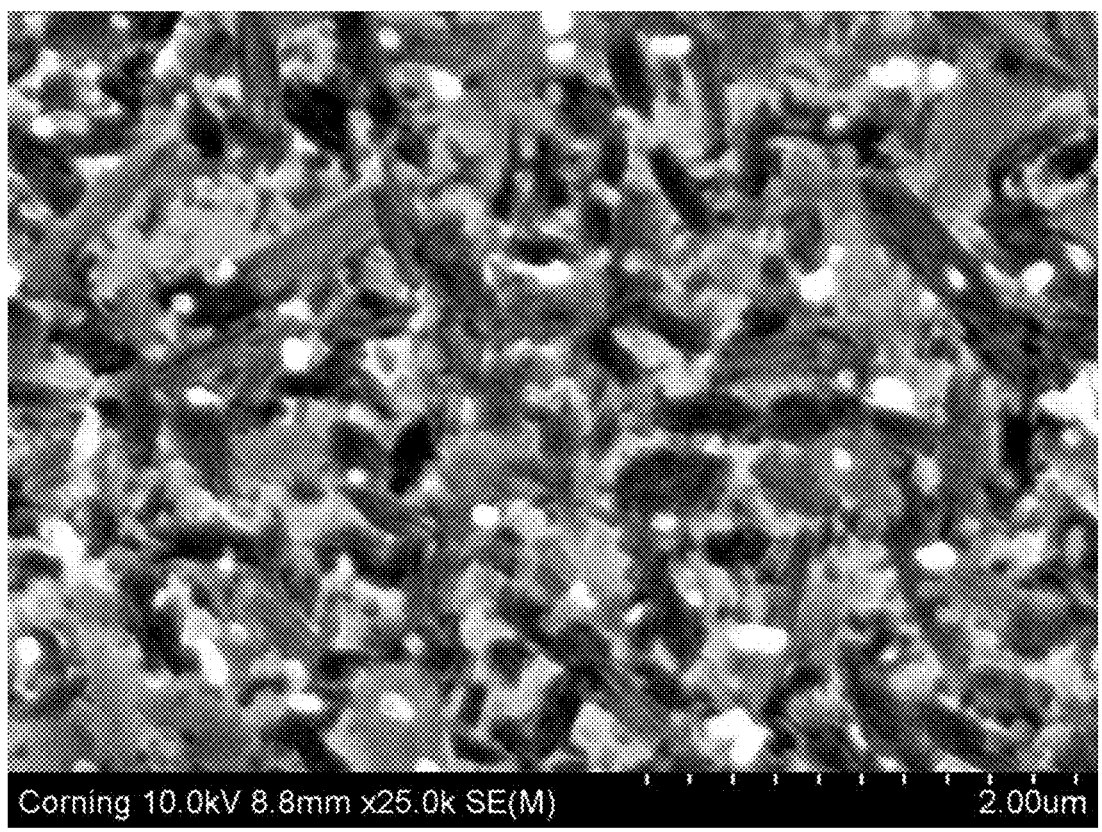
Figure 6B:
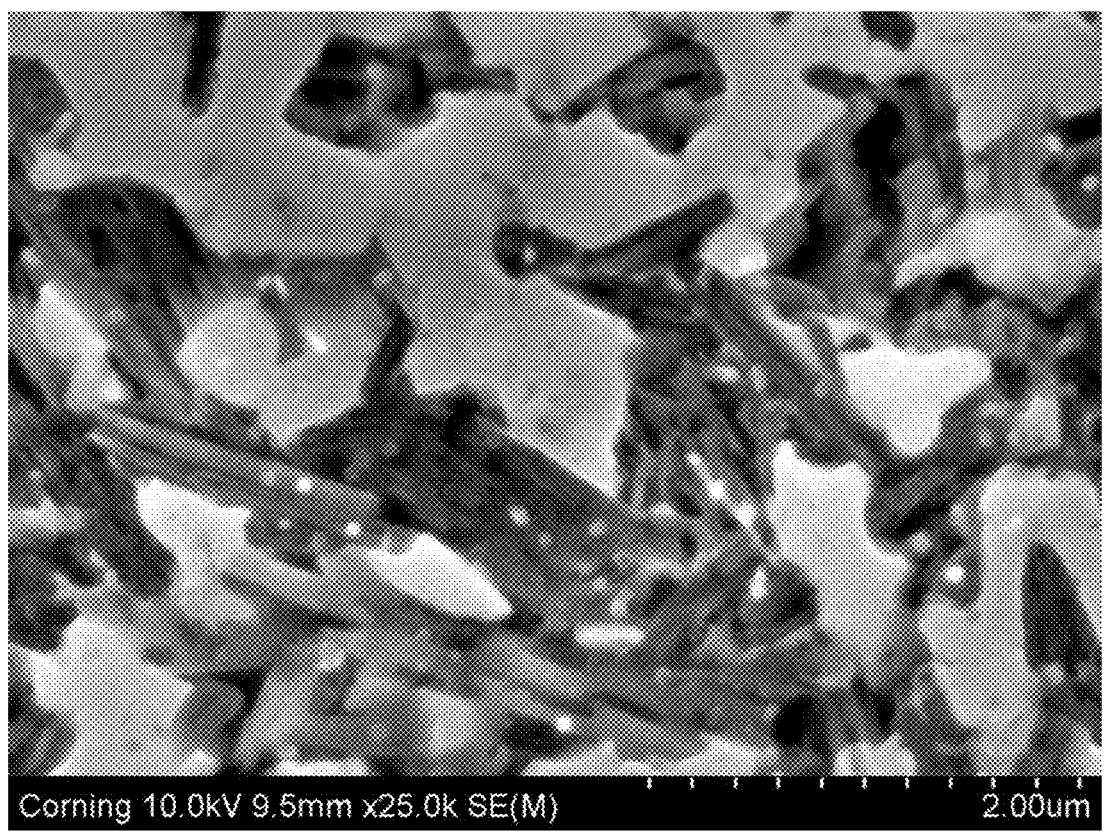

FIGS. 6A and 6B show SEM images of polished and etched glass ceramic surfaces. FIG. 6A is composition A, heat treated at 750° C. for two hours and 850° C. for four hours and having a lithium disilicate crystalline phase. FIG. 6B is composition KN (Table 3), heat treated at 750° C. for two hours and 850° C. for four hours and having lithium disilicate and ⍰-spodumene crystalline phases.

Figure 7:
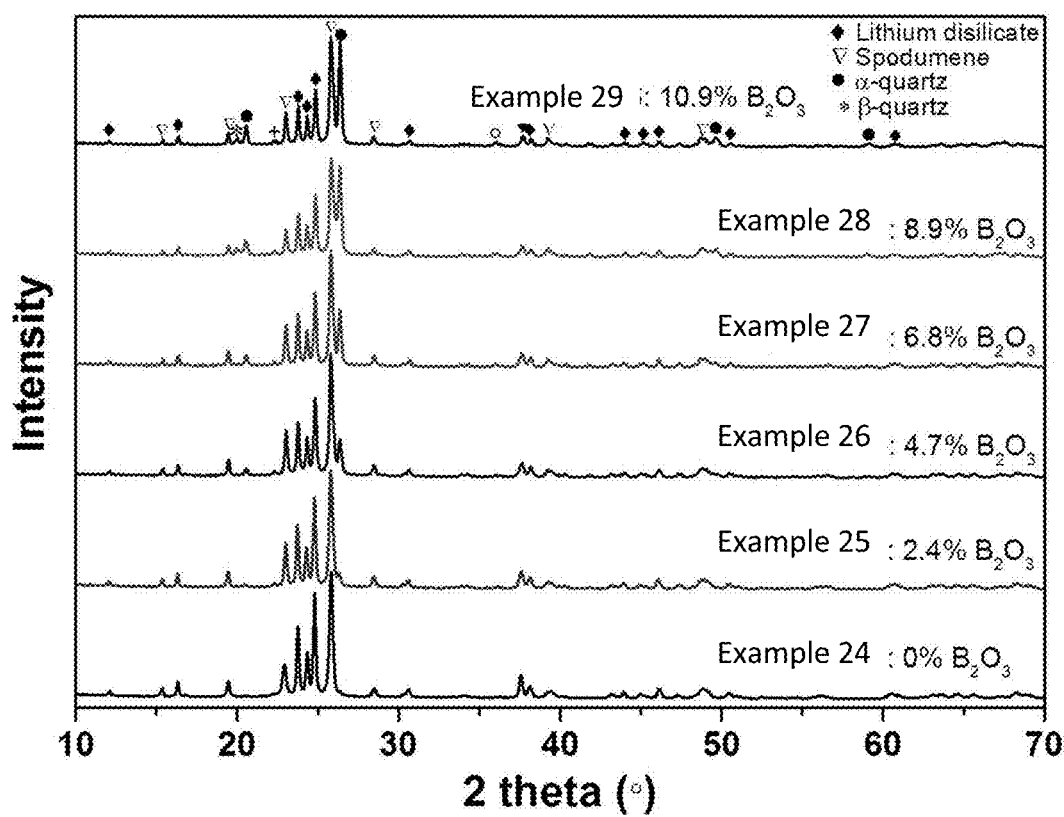

FIG. 7 shows X-ray diffraction (XRD) spectra of the crystallite phases in glass ceramics according to Examples 24-29 (Table 3).

FIGS. 8A-8D show SEM images of glass ceramics according to Examples 24-27 (Table 3), after etching in 1% HF solution for 1 minute.

Figure 9:
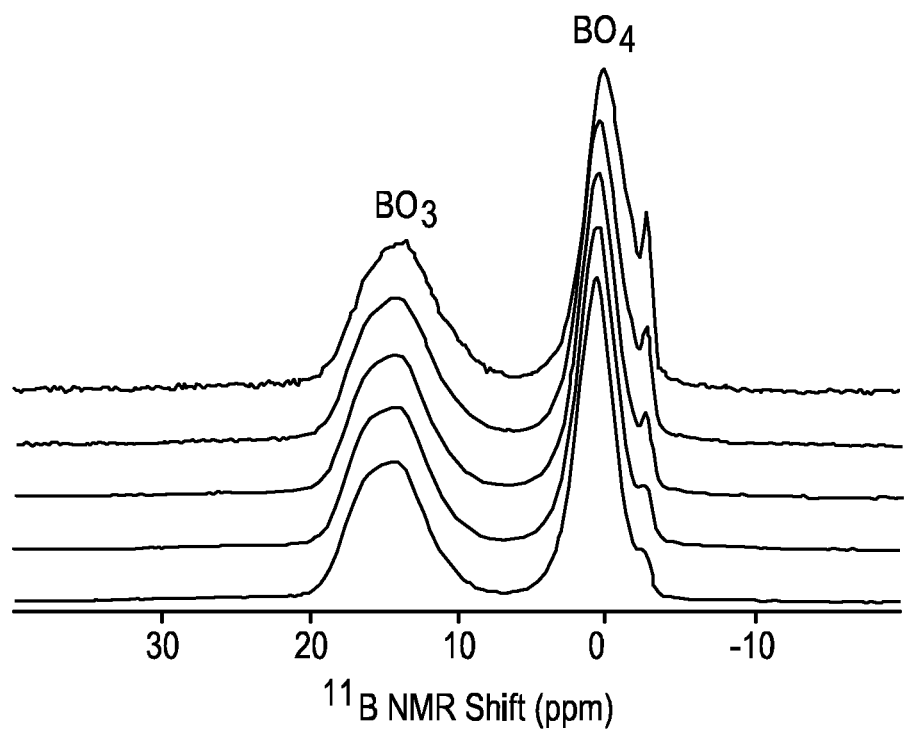

FIG. 9 shows $^{11}$Boron NMR spectra of selected glass ceramics formed from Examples 24-33 (Table 3).

Figure 10:
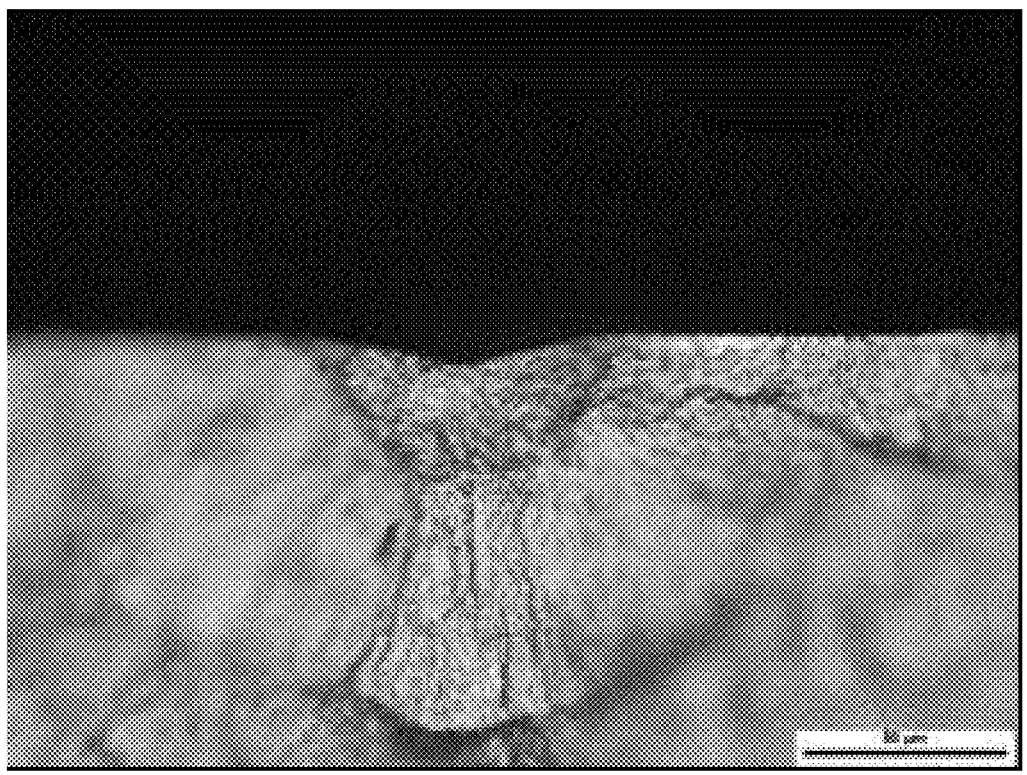

FIG. 10 shows an optical microscopy image of a cross-section of a glass ceramic according to Example 24 (Table 3), after indentation under a 3-kgf load using a Vickers indenter.

Figure 11:
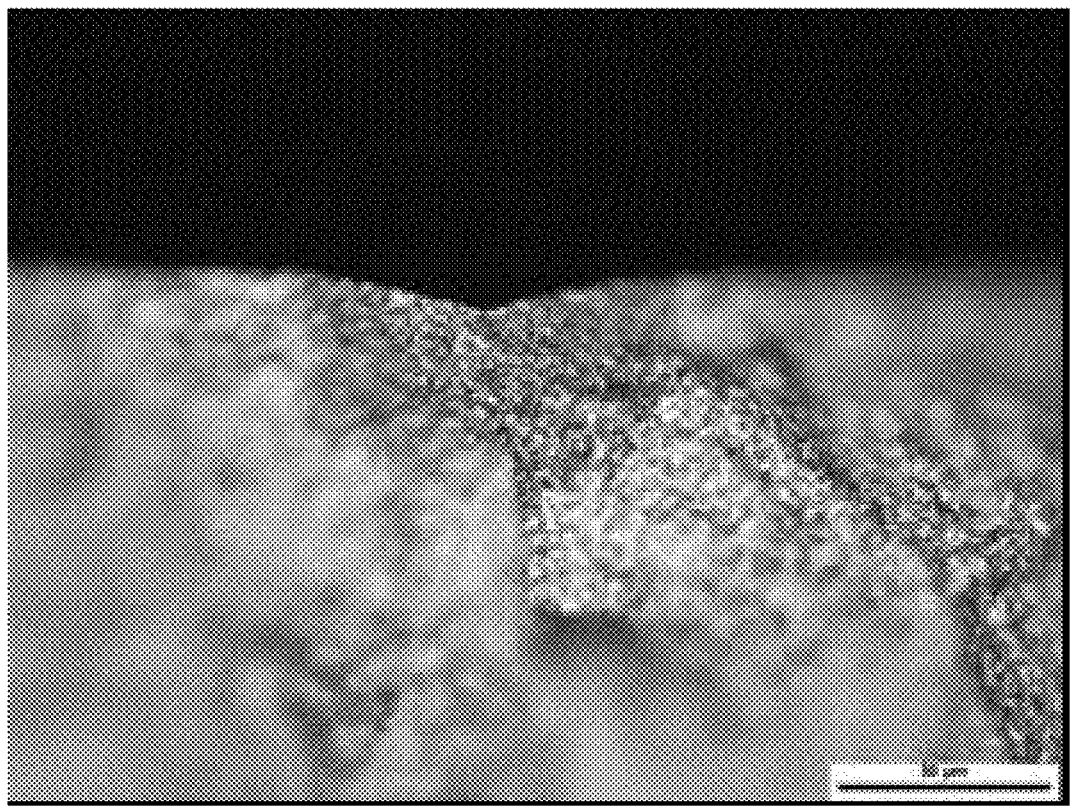

FIG. 11 shows an optical microscopy image of a cross-section of a glass ceramic according to Example 25 (Table 3), after indentation under a 3-kgf load using a Vickers indenter.

Figure 12:
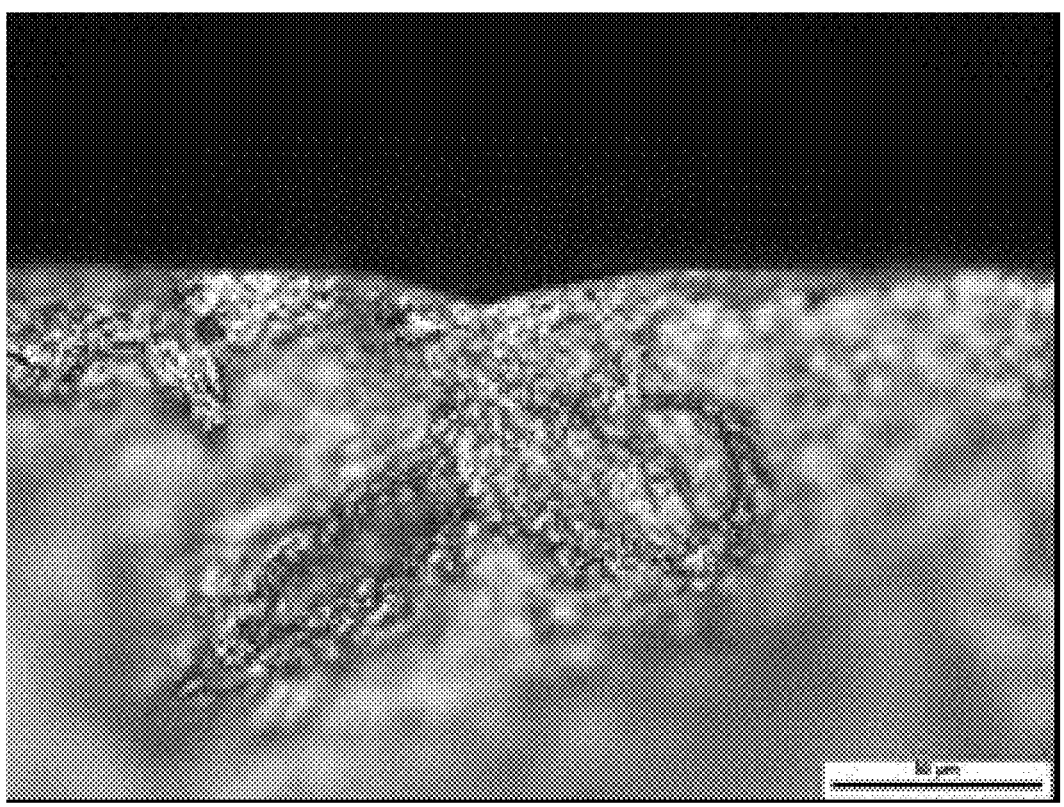

FIG. 12 shows an optical microscopy image of a cross-section of a glass ceramic according to Example 26 (Table 3), after indentation under a 3-kgf load using a Vickers indenter.

Figure 13:
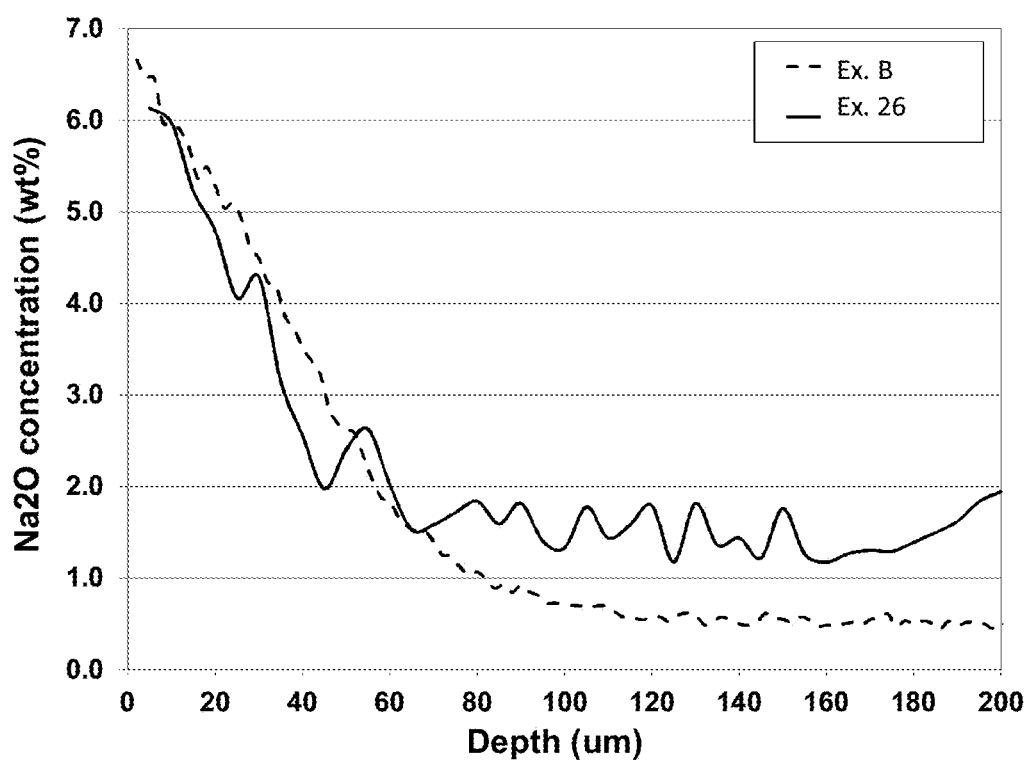

FIG. 13 is a graph showing the electron probe microanalysis (EPMA) of the concentration profile of Na-ions from the surface of a glass ceramic according to Example 26 (Table 3) and a glass ceramic according to Example B (Table 3), after being chemically strengthened.

Figure 14:
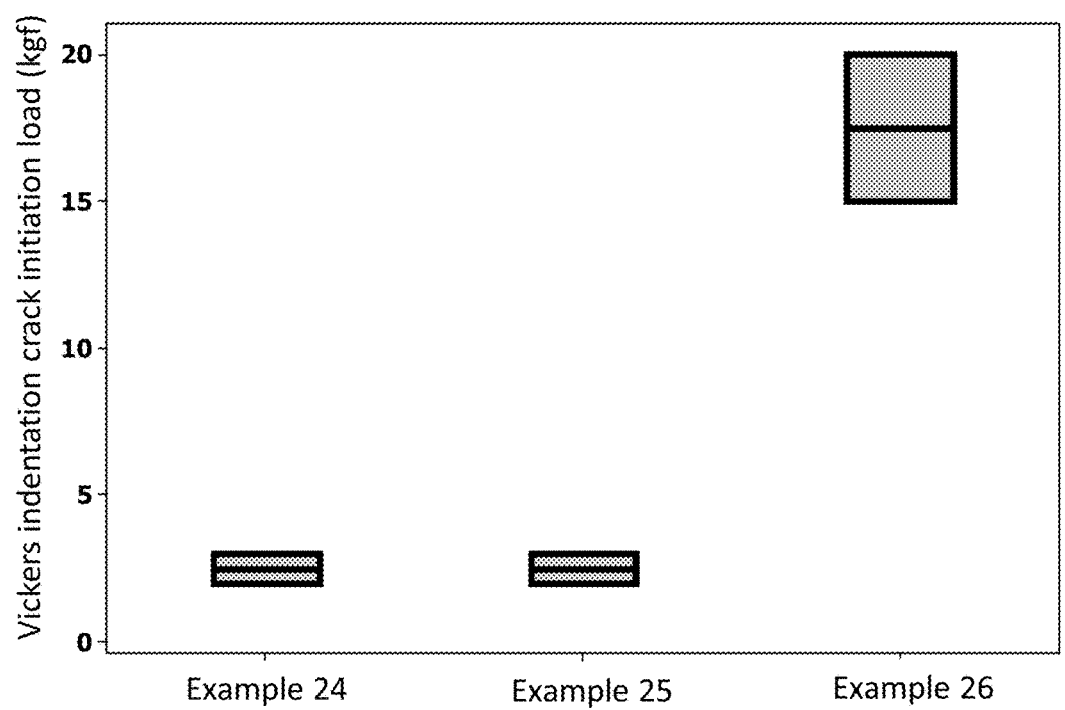
Figure 15A:
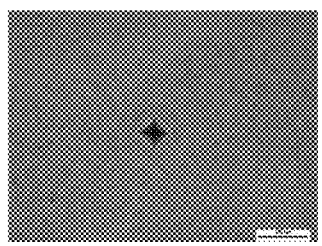
Figure 15B:
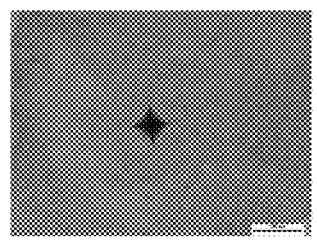
Figure 15C:
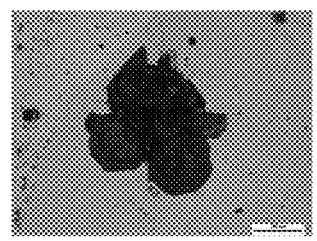
Figure 15D:
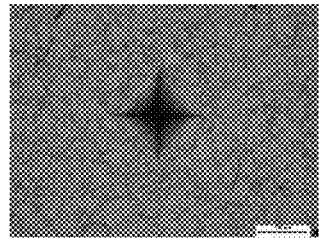
Figure 15E:
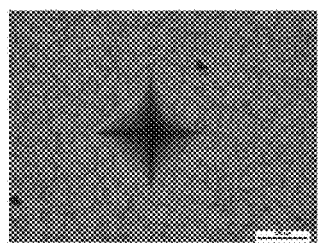
Figure 15F:
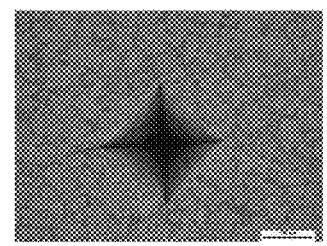

FIG. 14 is a graph showing the Vickers indentation crack initiation threshold values for glass ceramics according to Examples 24-26 (Table 3), after being chemically strengthened.

FIGS. 15A-15F show optical microscopy image of indentations under various loads using a Vickers indenter on glass ceramics according to Examples 24-26 (Table 3), after being chemically strengthened.

DETAILED DESCRIPTION

In the following detailed description, numerous specific details may be set forth in order to provide a thorough understanding of embodiments described herein. However, it will be clear to one skilled in the art when embodiments may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the embodiments, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

Unless otherwise specified, the concentrations of all constituents recited herein are expressed in terms of weight percent (wt %).

Glasses and Glass Ceramics

As noted previously, it is highly desirable to obtain a glass ceramic composition that has the mechanical properties of lithium disilicate glass ceramics, but is easily formed using traditional glass forming techniques, such as rolling, molding, and float processes. One advantages of compositions described herein is that adding a lithium aluminosilicate component to the glass (which increases overall the alumina component and decreases lithia) provides key benefits for both the precursor glass and final glass-ceramic properties. The unexpectedly improved properties include: 1) the glass retains a low melting temperature (below 1500° C.), yet provides a higher liquidus viscosity (>2000 poise) and a long working range that is compatible with conventional rolling, molding, and float processes; 2) inexpensive spodumene can be used as a batch material, lowering the amount of expensive lithium carbonate needed; 3) lithium disilicate is retained as a major crystal phase, providing inherently high mechanical strength and fracture toughness to the glass-ceramic; and 4) β-spodumene solid solution, hereinafter simply called β-spodumene, is added as a second major crystal phase, which lowers the bulk thermal expansion of the glass-ceramic, increasing its thermal shock resistance, and also can be ion-exchanged for additional mechanical strength. Additionally, the materials can be cerammed into shapes with minimal deformation, readily machined to precision shapes, cut, drilled, chamfered, tapped, polished to high luster with conventional ceramic machining tooling and even exhibit various degrees of translucency depending on composition and heat treatment. For reasons not yet well understood, glass ceramics in this family also exhibit the ability to produce excellent sound reproduction when mechanically driven at sonic frequencies. These properties make the glass ceramics useful for a broad number of applications, such as countertops and other surfaces, hand-held, desk-top, and wall-mounted consumer electronic device coverings, appliance doors and exteriors, floor tiles, wall panels, ceiling tiles, white boards, materials storage containers (holloware) such as beverage bottles, food sales and storage vessels, machine parts requiring light weight, good wear resistance and precise dimensions, and acoustic elements such as audio speakers. The glass ceramics may be formed in three-dimensional articles using various methods due to its lower viscosity.

Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals.

There are two broad families of lithium disilicate glass-ceramics. The first group comprises those that are doped with ceria and a noble metal such as silver. These can be photosensitively nucleated via UV light and subsequently heat-treated to produce strong glass-ceramics such as Fotoceram®. The second family of lithium disilicate glass-ceramics is nucleated by the addition of $P_2O_5$, wherein the nucleating phase is $Li_3PO_4$. $P_2O_5$-nucleated lithium disilicate glass-ceramics have been developed for applications as varied as high-temperature sealing materials, disks for computer hard drives, transparent armor, and dental applications.

β-spodumene, also known as stuffed keatite, possesses a framework structure of corner-connected $SiO_4$ and $AlO_4$ tetrahedra that form interlocking rings, which in turn create channels that contain Li ions. While the β-spodumene formula is often given as $LiAlSi_2O_6$, the crystal can accommodate a wide range of solid solution toward silica, encompassing $Li_2O.Al_2O_3.nSiO_2$ with n from 4 to 9, or from less than 60 to almost 80 wt % $SiO_2$. β-spodumene crystals possess very low thermal expansion because as temperature increases, their c-axis expands while their a and b axes contract. As a result, glass-ceramics based on β-spodumene solid solution are useful technologically in applications requiring good thermal shock resistance, such as cookware. Moreover, glass-ceramic articles based on the β-spodumene phase can be chemically strengthened in a salt bath, during which $Na^+$ (and/or $K^+$) replaces $Li^+$ in the β-spodumene structure, which causes surface compression and strengthening.

Figure 1A:
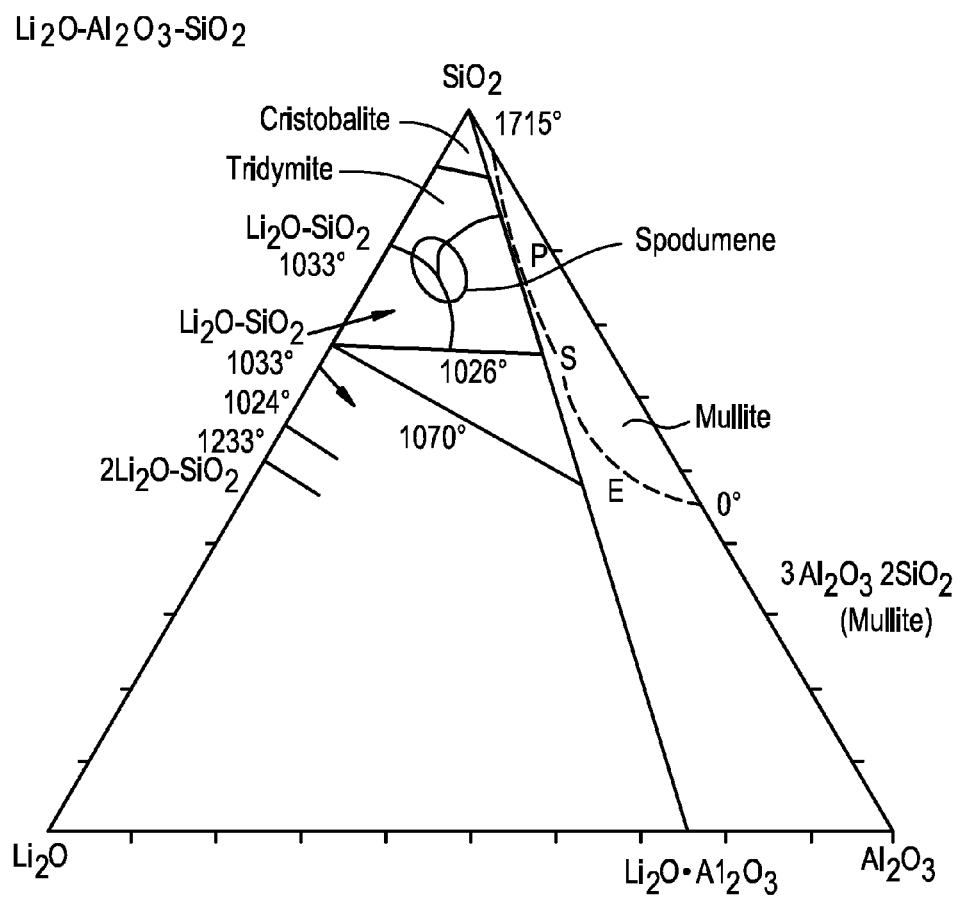
Figure 1B:
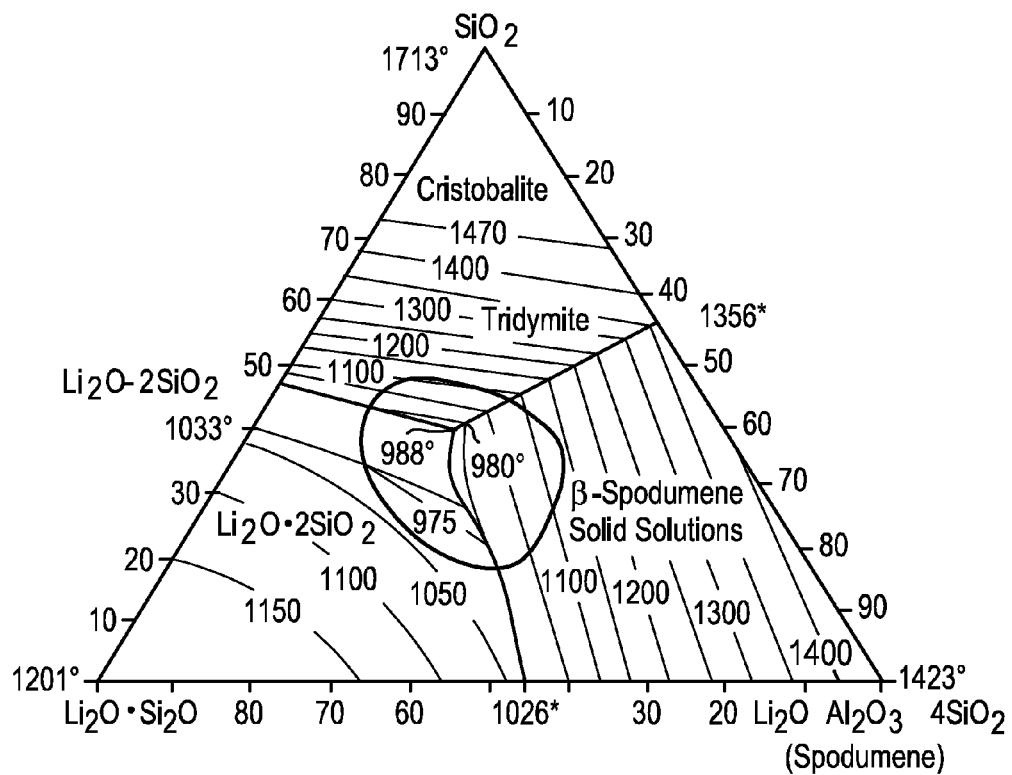

The glasses and glass ceramics described herein may be generically described as lithium-containing aluminosilicate glasses or glass ceramics and comprise $SiO_2$, $Al_2O_3$, and $Li_2O$. The ternary phase diagram for $Li_2O$—$Al_2O_3$—$SiO_2$ is shown in FIG. 1A. The oval roughly illustrates the area of glass compositions, embodied in this disclosure, that yield stable glasses and glass-ceramics comprising lithium disilicate and β-spodumene crystalline phases. The triangle in FIG. 1A is magnified in FIG. 1B and shows the pseudo-ternary $SiO_2$—$Li_2O.SiO_2$—$Li_2O. Al_2O_3.4SiO_2$. The shaded area indicates one compositional area for stable glasses with liquidus temperatures of 1150° C. or lower yielding glass-ceramics comprising lithium disilicate and β-spodumene crystalline phases. In addition to $SiO_2$, $Al_2O_3$, and $Li_2$Om, the glasses and glass ceramics embodied herein may further contain alkali salts, such as $Na_2O$, $K_2O$, $Rb_2O$, or $Cs_2O$, as well as $P_2O_5$, and $ZrO_2$ and a number of other components as described below. In one or more embodiments, the major crystallite phases include lithium disilicate and β-spodumene ss, but β-quartz ss and lithium phosphate may also be present as minor phases depending on the compositions of the precursor glass.

$SiO_2$, an oxide involved in the formation of glass, can function to stabilize the networking structure of glasses and glass ceramics. In some embodiments, the glass or glass ceramic composition comprises from 68 to about 82 wt % $SiO_2$. In some embodiments, the glass or glass ceramic composition comprises from 75 to about 80 wt % $SiO_2$. In some embodiments, the glass or glass ceramic composition can comprise from about 68 to about 82 wt %, about 68 to about 80 wt %, about 68 to about 77 wt %, about 68 to about 75 wt %, about 68 to about 73 wt %, 69 to about 82 wt %, about 69 to about 80 wt %, about 69 to about 77 wt %, about 69 to about 75 wt %, about 69 to about 73 wt %, about 70 to about 82 wt %, about 70 to about 80 wt %, about 70 to about 77 wt %, about 70 to about 75 wt %, about 70 to about 73 wt %, about 73 to about 82 wt %, about 73 to about 80 wt %, about 73 to about 77 wt %, about 73 to about 75 wt %, about 75 to about 82 wt %, about 75 to about 80 wt %, about 75 to about 77 wt %, about 77 to about 82 wt %, about 77 to about 80 wt %, or about 80 to about 82 wt % $SiO_2$. In some embodiments, the glass or glass ceramic composition comprises about 68, 69, 70, 71, 72, 73, 74, 75, 76, 77, 78, 79, 80, 81, or 82 wt % $SiO_2$.

With respect to viscosity and mechanical performance, the viscosity and mechanical performance are influenced by glass compositions. In the glasses and glass ceramics, $SiO_2$ serves as the primary glass-forming oxide for the precursor glass and can function to stabilize the networking structure of glass and glass ceramic. The concentration of $SiO_2$ should be sufficiently high in order to form lithium disilicate and β-spodumene crystal phase when the precursor glass is heat treated to convert to a glass-ceramic. The amount of $SiO_2$ may be limited to control melting temperature (200 poise temperature), as the melting temperature of pure $SiO_2$ or high-$SiO_2$ glasses is undesirably high.

$Al_2O_3$ may also provide stabilization to the network and is an essential constituent in the β-spodumene crystal phase. If the amount of $Al_2O_3$ is too high, however, the fraction of lithium disilicate crystals may be decreased, possibly to the extent that an interlocking structure cannot be formed. The amount of $Al_2O_3$ may be tailored to control viscosity. Further, if the amount of $Al_2O_3$ is too high, the viscosity of the melt is also generally increased. In some embodiments, the glass or glass ceramic composition can comprise from about 5 to about 12.5 wt % $Al_2O_3$. In some embodiments, the glass or glass ceramic composition can comprise from about 6 to about 9 wt % $Al_2O_3$. In some embodiments, the glass or glass ceramic composition can comprise from about 5 to about 12.5 wt %, about 5 to about 10 wt %, about 5 to about 9 wt %, about 5 to about 8 wt %, about 6 to about 12.5 wt %, about 6 to about 10 wt %, about 6 to about 9 wt %, about 6 to about 8 wt %, about 8 to about 12.5 wt %, about 8 to about 10 wt %, about 8 to about 9 wt %, about 9 to about 12.5 wt %, about 9 to about 10 wt %, or about 10 to about 12.5 wt % $Al_2O_3$. In some embodiments, the glass or glass ceramic composition can comprise about 5, 5.5, 6, 6.5, 7, 8, 9, 9.5, 10, 10.5, 11, 11.5, 12, or 12.5 wt % $Al_2O_3$.

In the glass and glass ceramics herein, it is generally found that $Li_2O$ is advantageous for forming both lithium disilicate and b-spodumene crystal phases. In fact, to obtain lithium disilicate and b-spodumene as the predominant crystal phases, it is desirable to have at least about 8 wt % $Li_2O$ in the composition. Additionally, it has been found that once $Li_2O$ gets too high—greater than about 15 wt %—the composition becomes very fluid with low resistivity making it difficult to melt or form. In some embodied compositions, the glass or glass ceramic can comprise from about 8 wt % to about 15 wt % $Li_2O$. In other embodiments, the glass or glass ceramic can comprise from about 10 wt % to about 13 wt % $Li_2O$. In some embodiments, the glass or glass ceramic composition can comprise from about 8 to about 15 wt %, about 8 to about 14 wt %, about 8 to about 13 wt %, about 8 to about 12 wt %, about 8 to about 11 wt %, about 9 to about 15 wt %, about 9 to about 14 wt %, about 9 to about 13 wt %, about 9 to about 12 wt %, about 9 to about 11 wt %, about 9 to about 10 wt %, about 10 to about 15 wt %, about 10 to about 14 wt %, about 10 to about 13 wt %, about 10 to about 12 wt %, or about 10 to about 11 wt % $Li_2O$. In some embodiments, the glass or glass ceramic composition can comprise about 8, 9, 10, 11, 12, 13, 14, or 15 wt % $Li_2O$.

As noted above, $Li_2O$ is generally useful for forming the embodied glass ceramics, but the other alkali oxides tend to decrease glass ceramic formation and form an aluminosilicate residual glass in the glass-ceramic. It has been found that more than about 5 wt % $Na_2O$ or $K_2O$, or combinations thereof, leads to an undesirable amount of residual glass which can lead to deformation during crystallization and undesirable microstructures from a mechanical property perspective. Therefore, in general, the compositions described herein have very low amounts of non-lithium alkali oxides. In some embodiments, the glass or glass ceramic composition can comprise from about 0 to about 5 wt % $R_2O$, wherein R is one or more of the alkali cations Na and K. In some embodiments, the glass or glass ceramic composition can comprise from about 1 to about 3 wt % $R_2O$, wherein R is one or more of the alkali cations Na and K. In some embodiments, the glass or glass ceramic composition can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $Na_2O$ or $K_2O$, or combinations thereof. In some embodiments, the glass or glass ceramic composition can comprise about 0, >0, 1, 2, 3, 4, or 5 wt % $R_2O$.

In some embodiments, the glass composition can comprise from about 8 to about 25 wt % $M_2O$, wherein M is Li and optionally, one or more of the alkali cations Na, K, Rb, and Cs. In some embodiments, the glass or glass ceramic composition can comprise from about 9 to about 16 wt % $M_2O$, wherein M is Li and optionally, one or more of the alkali cations Na, K, Rb, and Cs. In some embodiments, $M_2O$ can comprise only trace amounts of $Na_2O$ or $K_2O$. In some embodiments, the glass or glass ceramic composition can comprise from about 8 to about 25 wt %, about 8 to about 20 wt %, about 8 to about 17 wt %, about 8 to about 13 wt %, about 8 to about 10 wt %, about 10 to about 25 wt %, about 10 to about 20 wt %, about 10 to about 16 wt %, about 10 to about 13 wt %, about 13 to about 25 wt %, about 13 to about 20 wt %, about 13 to about 16 wt %, about 16 to about 25 wt %, about 16 to about 20 wt %, or about 20 to about 25 wt % $M_2O$. In some embodiments, the glass or glass ceramic composition can comprise about 8, 9, 10, 11, 12, 13, 14, 15, 16, 17, 18, 19, 20, 21, 22, 23, 24, or 25 wt % $M_2O$.

The glass and glass ceramic compositions comprise $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodiments can comprise from >0 to about 5 wt % $P_2O_5$. Other embodiments can comprise about 0.5 to about 4 wt % $P_2O_5$. Still other embodiments can comprise about 1 to about 3 wt % or about 1.5 to about 2.5 wt % $P_2O_5$. Embodied compositions can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 0.5 to about 5 wt %, about 0.5 to about 4 wt %, about 0.5 to about 3 wt %, about 0.5 to about 2 wt %, about 0.5 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $P_2O_5$. In some embodiments, the glass or glass ceramic composition can comprise about 0, >0, 0.5, 1, 2, 3, 4, or 5 wt % $P_2O_5$.

The glasses or glass ceramics embodied herein can comprise 0 to 10 wt % $ZrO_2$. In some embodiments, the glass or glass ceramic composition can comprise from 0 to about 10 wt % $ZrO_2$. In some embodiments, the glass composition about from 0 to about 5 wt % $ZrO_2$. In some embodiments, the glass composition can comprise from >0 to about 5 wt % $ZrO_2$. In some embodiments, the glass composition can comprise from 0 to about 10 wt %, 0 to about 8 wt %, 0 to about 6 wt %, 0 to about 5 wt %, 0 to 3 wt %, 0 to about 1 wt %, >0 to about 10 wt %, >0 to about 8 wt %, >0 to about 6 wt %, >0 to about 5 wt %, >0 to 3 wt %, >0 to about 1 wt %, 1 to about 10 wt %, about 1 to about 8 wt %, about 1 to about 6 wt %, about 1 to about 5 wt %, about 1 to 3 wt %, about 1 to 2 wt %, about 2 to about 10 wt %, about 2 to about 8 wt %, about 2 to about 6 wt %, about 2 to about 5 wt %, about 2 to 3 wt %, about 3 to about 10 wt %, about 3 to about 8 wt %, about 3 to about 6 wt %, about 3 to about 5 wt %, about 5 to about 10 wt %, about 5 to about 8 wt %, about 5 to about 6 wt %, about 6 to about 10 wt %, about 6 to about 8 wt %, or about 8 to about 10 wt % $ZrO_2$. In some embodiments, the glass composition can comprise about 0, >0, 1, 2, 3, 4, 5, 6, 7, 8, 9, or 10 wt % $ZrO_2$.

Figure 3:
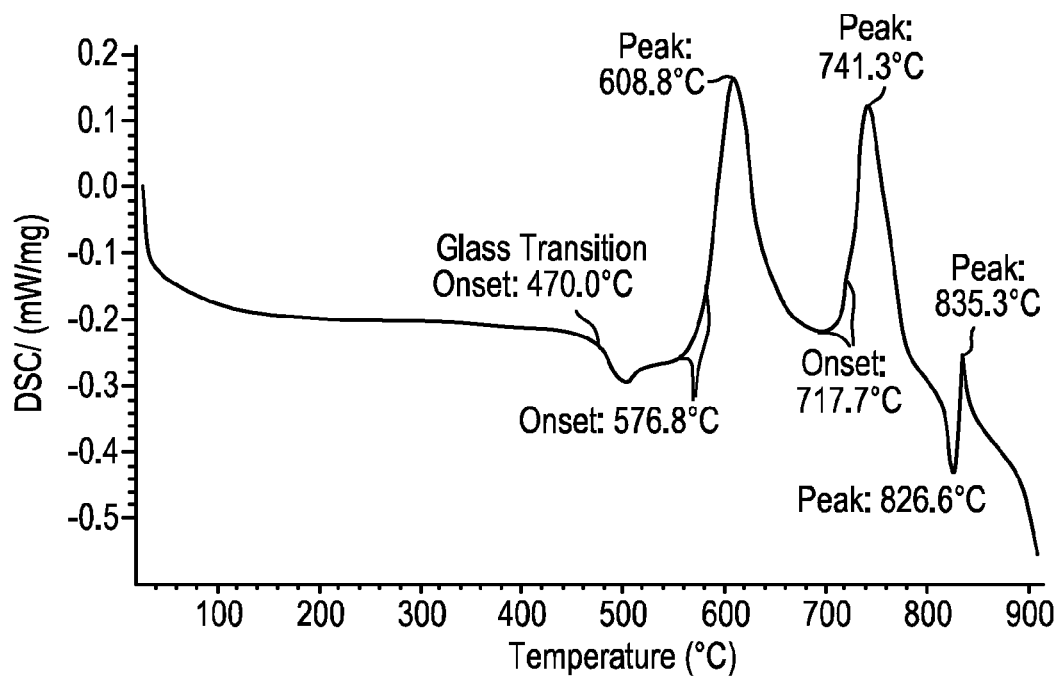
FIG. 3 is a differential scanning calorimetry (DSC) trace for composition MX (Table 3).

$B_2O_3$ is conducive to providing a precursor glass with a low melting temperature. For example, to achieve a glass melting temperature of less than 1600° C., the glass may include at least about 2.5 wt % $B_2O_3$. Furthermore, the addition of $B_2O_3$ in the precursor glass and thus the glass-ceramics helps achieve an interlocking crystal microstructure and improve the damage resistance of the glass ceramic. When boron in the residual glass is not charge balanced by alkali oxides or divalent cation oxides, it will be in trigonal-coordination state (or three-coordinated boron) (see for example, FIG. 3), which opens up the structure of the glass and glass ceramic. The network around these three-coordinated boron is not as rigid as tetrahedrally coordinated (or four-coordinated) boron. Without being bound by theory, it is believed that precursor glasses and glass ceramics that include three-coordinated boron can tolerate some degree of deformation before crack formation. By tolerating some deformation, the Vickers indentation crack initiation values are increased. Fracture toughness of the precursor glasses and glass ceramics that include three-coordinated boron may also be increased. Without being bound by theory, it is believed that the presence of boron in the residual glass of the glass ceramic (and precursor glass) lowers the viscosity of the residual glass (or precursor glass), which facilitates the growth of lithium disilicate crystals, especially large crystals having a high aspect ratio. A greater the amount of three-coordinated boron (in relation to four-coordinated boron) is believed to result in glass ceramics that exhibit a greater Vickers indentation crack initiation load. In some embodiments the amount of three-coordinated boron (as a percent of total $B_2O_3$) may be about 40% or greater, 50% or greater, 75% or greater, about 85% or greater or even about 95% or greater. The amount of boron in general should be controlled to maintain chemical durability and mechanical strength of the cerammed bulk glass ceramic.

In one or more embodiments, the glasses and glass ceramic herein may comprise from 0 to about 12 wt %, from about 2 wt % to about 12 wt % or from about 2.5 wt % to about 7.5 wt % $B_2O_3$. In some embodiments, the glass or glass composition can comprise from 0 to about 12 wt %, 0 to about 11 wt %, 0 to about 10 wt %, 0 to about 9 wt %, 0 to about 8 wt %, 0 to about 7 wt %, 0 to about 6 wt %, 0 to about 5 wt %, 0 to about 4 wt %, 0 to about 3 wt %, >0 to about 12 wt %, >0 to about 10 wt %, >0 to about 8 wt %, >0 to about 6 wt %, >0 to about 5 wt %, about 1 to about 12 wt %, about 1 to about 10 wt %, about 1 to about 8 wt %, about 1 to about 6 wt %, about 1 to about 5 wt %, about 2 to about 12 wt %, about 2 to about 10 wt %, about 2 to about 8 wt %, about 2.5 to about 12 wt %, about 2.5 to about 10 wt %, about 2.5 to about 8 wt %, about 2.5 to about 6 wt %, about 5 wt % to about 7.5 wt %, about 3 to about 6 wt %, about 3 to about 5 wt %, about 4 to about 5 wt %, about 5 wt % to about 8 wt %, about 5 wt % to about 7.5 wt %, about 5 wt % to about 6 wt %, or about 5 wt % to about 5.5 wt % $B_2O_3$. In some embodiments, the glass composition can comprise about 0, >0, 1, 2, 3, 4, 5, 6, 7, 8, 9, 10, 11 or 12 wt % $B_2O_3$.

Glass and glass ceramic compositions described herein tend to have limited alkali earth metal oxides, MgO, CaO, SrO, and BaO, due to likelihood that these components, particularly CaO, SrO, and BaO, would likely enter the residual glass phase, or alternatively, promote alternative, unwanted crystalline phases. MgO can enter the β-spodumene crystalline phase, so is less likely to have the adverse issues of the other alkali earth oxides. Compositions may comprise one or more alkali earth metal oxides, MgO, CaO, SrO, and BaO. Some embodiments may comprise one or more alkali earth metal oxides, MgO, CaO, SrO, and BaO, in amounts from 0 to about 15 wt %. Other embodiments may comprise one or more alkali earth metal oxides, MgO, CaO, SrO, and BaO, from about 0 to about 8 wt %. In some examples where an alkali earth metal oxide is present, the alkali earth metal oxide is MgO. In other examples where more than one alkali earth metal oxide is present, the alkali earth metal oxide is predominantly MgO. The glass and glass ceramic compositions embodied herein can comprise one or more alkali earth metal oxides, MgO, CaO, SrO, and BaO, from 0 to about 15 wt %, 0 to about 10 wt %, 0 to about 8 wt %, 0 to about 5 wt %, 0 to about 3 wt %, >0 to about 15 wt %, >0 to about 10 wt %, >0 to about 8 wt %, >0 to about 5 wt %, >0 to about 3 wt %, >0 to about 1 wt %, about 1 to about 15 wt %, about 1 to about 10 wt %, about 1 to about 8 wt %, about 1 to about 5 wt %, about 1 to about 3 wt %, about 3 to about 15 wt %, about 3 to about 10 wt %, about 3 to about 8 wt %, about 3 to about 5 wt %, about 5 to about 15 wt %, about 5 to about 10 wt %, about 5 to about 8 wt %, about 8 to about 15 wt %, about 8 to about 8 wt %, or about 10 to about 15 wt % R'O. In some embodiments, the glass or glass ceramic comprises one or more alkali earth metal oxides, MgO, CaO, SrO, and BaO, in the amount of 0, >0, 1, 2, 3, 4, 4.5, 5, 6, 7, 8, 9, 10, 11, 12, 13, 14, or 15 wt %.

As defined herein, R'O comprises the wt % of MgO, CaO, SrO, and BaO. In some embodiments, the glass composition can comprise from 0 to about 15 wt % R'O. In some embodiments, the glass composition can comprise from about 0 to about 8 wt % R'O. The glass and glass ceramic compositions embodied herein can comprise from 0 to about 15 wt %, 0 to about 10 wt %, 0 to about 8 wt %, 0 to about 5 wt %, 0 to about 3 wt %, >0 to about 15 wt %, >0 to about 10 wt %, >0 to about 8 wt %, >0 to about 5 wt %, >0 to about 3 wt %, >0 to about 1 wt %, about 1 to about 15 wt %, about 1 to about 10 wt %, about 1 to about 8 wt %, about 1 to about 5 wt %, about 1 to about 3 wt %, about 3 to about 15 wt %, about 3 to about 10 wt %, about 3 to about 8 wt %, about 3 to about 5 wt %, about 5 to about 15 wt %, about 5 to about 10 wt %, about 5 to about 8 wt %, about 8 to about 15 wt %, about 8 to about 8 wt %, or about 10 to about 15 wt % R'O. In some embodiments, the glass or glass ceramic composition can comprise about 0, >0, 1, 2, 3, 4, 4.5, 5, 6, 7, 8, 9, 10, 11, 12, 13, 14, or 15 wt % R'O.

In some embodiments, glass and glass ceramic compositions may comprise additional components as coloring agents. In some embodiments, the glass or glass ceramic comprises from 0 to about 4 wt %, 0 to about 3 wt %, 0 to about 2 wt %, 0 to about 1 wt %, 0 to 0.5 wt %, >0 to about 4 wt %, >0 to about 3 wt %, >0 to about 2 wt %, >0 to about 1 wt %, >0 to 0.5 wt %, about 0.5 to about 4 wt %, about 0.5 to about 3 wt %, about 0.5 to about 2 wt %, about 0.5 to about 1 wt %, about 1 to about 4 wt %, about 1 to about 3 wt %, about 1 to about 2 wt %, about 2 to about 4 wt %, about 2 to about 3 wt %, or about 3 to about 4 wt %. Coloring agents can include, but are not limited to, FeO, $Fe_2O_3$, SnO, $SnO_2$, $V_2O_5$, $Cr_2O_3$, $TiO_2$, $MnO_2$, NiO, ZnO, CuO, NiO, $Co_3O_4$, and combinations thereof. For instance, Table 2 shows examples of coloring agents in glasses and glass ceramics and the resulting color for a polished surface. The composition used was KY (Table 3) wherein the glass ceramic was cerammed at 650° C. for two hours and 825° C. for four hours.

TABLE 2

| Oxide (wt %, in excess) | Glass | Glass-ceramic |
| --- | --- | --- |
| 1.7$V_2O_5$ | Purplish | Yellow-purple |
| 0.1$Cr_2O_3$ | Green | Green |
| 1.6$MnO_2$ | Burgundy | Yellow-purple |
| 3.1$MnO_2$ | Yellow | Tan |
| 1.4$Fe_2O_3$ | Green-brown | Brownish-grey |
| 2.9$Fe_2O_3$ | Dark blue-green | Black |
| 0.2$Co_3O_4$ | Blue | Blue |
| 0.7NiO | Dark magenta | Brown |
| 0.7CuO | Blue green | Blue green |
| 1.5$Fe_2O_3$ + 1.5$TiO_2$ | Olive green | Dark charcoal grey |
| 2.2$Fe_2O_3$ + 1.5$TiO_2$ | Olive green | Black |
| 2.9$Fe_2O_3$ + 1.5$TiO_2$ | Olive green | Black |
| 2.3MnO2 + 0.7$Fe_2O_3$ + 1.4$TiO_2$ | Olive green | Brown |

In some embodiments, the precursor glass and glass ceramic may include one or more coloring agents to provide a desired color and/or opacity. In some embodiments, $TiO_2$ may be added to provide the glass ceramic with a dense white or cream color, and a specific opacity. The amount of $TiO_2$ may be up to about 4 wt % (e.g., 0.1-4 wt %, 0.5-4 wt %, 1-4 wt %, 2-4 wt %, or 3-4 wt %). Where $TiO_2$ is utilized, the resulting glass ceramic may also include a minor rutile crystal phase. In some embodiments, the presence of $TiO_2$ in the recited amount can yield a more opaque glass ceramic, which will exhibit a different white color than glass ceramics that do not include any $TiO_2$ or include amounts of TiO2 that fall outside the ranges recited herein. In other embodiments, NiO, $Co_3O_4$ and/or $Fe_2O_3$ may be included to provide a glass ceramic with a black color and possibly a specific opacity. NiO, $Co_3O_4$ and/or $Fe_2O_3$ may be present in a combined total up to about 3 wt % (e.g., 0.1-3 wt %, 0.5-3 wt %, 1-3 wt %, 1.5-3 wt %, or 2-3 wt %). Where such coloring agents are utilized to provide a black color, such agents typically are present in the glass phase of the resulting glass ceramic, with the exception of $Fe_2O_3$, which may be present in the β-spodumene phase.

In some embodiments, the glass ceramic exhibits opaqueness and an average % opacity≥85% for a 0.8 mm thickness over the wavelength range from about 380 nm to about 780 nm. In some instances, the glass ceramic may exhibit an average % opacity for a 0.8 mm thickness over the wavelength range from about 380 nm to about 780 nm of about 100%. In one or more embodiments, the average opacity is 86% or greater, 87% or greater, 88% or greater 89% or greater, greater than about 90%, greater than about 91%, greater than about 92%, greater than about 93%, greater than about 94%, greater than about 95%, greater than about 96%, greater than about 97%, greater than about 98%, greater than about 99% or even 100%, for a 0.8 mm thickness over the wavelength range of 380 nm to about 780 nm.

In one or more embodiments, the glass ceramic may exhibit a white color or may be characterized as substantially white. As used herein, the term "substantially white" means that the glass ceramic has a color presented in CIELAB color space coordinates determined from specular reflectance measurements using a spectrophotometer, with illuminant D65 and specular reflectance excluded, including CIE a* in the range from about −2 to about 8; CIE b* in the range from about −7 to about 30; and CIE L* in the range from about 85 to about 100. Moreover, the glass ceramic exhibits an substantially white color even when processing conditions utilized to form the glass ceramic varies. For example, the glass ceramic exhibits a substantially white color even when heat treatment temperature(s) vary by as much as 100° C. In one variant, the substantially white color is exhibited by the glass ceramic when heat treatment temperatures vary by more than 5° C., 10° C., 20° C., 30° C., 40° C., 50° C., 60° C., 70° C., 80° C., 90° C. and 95° C.

In one or more embodiments, the glass ceramic exhibits a substantially black color. As used herein, the term "substantially black" means that the glass ceramic has a color presented in CIELAB color space coordinates determined from specular reflectance measurements using a spectrophotometer, with illuminant D65 and specular reflectance excluded, including CIE a* in the range from about −1.0 to about 1.5 (e.g., from about −0.2 to about 1.0); CIE b* in the range from about 3.5 to about 1.5 (e.g., from about −2.5 to about 1.0); and CIE L* in the range from about 0 to about 18 (e.g., from about 0 to about 16 or from about 0 to about 14). Moreover, the glass ceramic exhibits an substantially black color even when processing conditions utilized to form the glass ceramic varies. For example, the glass ceramic exhibits an substantially black color even when heat treatment temperature(s) vary by as much as 100° C. In one variant, the substantially black, color is exhibited by the glass ceramic when heat treatment temperatures vary by more than 5° C., 10° C., 20° C., 30° C., 40° C., 50° C., 60° C., 70° C., 80° C., 90° C. and 95° C.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

Alternatively, or in addition to coloring agents, antimicrobial components may be added to the glass or glass ceramic composition. This is particularly advantageous as glass ceramics embodied herein can be used in applications such as kitchen or dining countertops where exposure to harmful bacteria is likely. Antimicrobial components that may be added to the glass or glass ceramic include, but are not limited to, Ag, AgO, Cu, CuO, $Cu_2O$, and the like. In some embodiments, the concentrations of the antimicrobial components are kept at a level of about 3, 2, 1, or 0.5, >0 wt %. In some embodiments, the antimicrobial components is from >0 to about 3 wt %. In some embodiments, the antimicrobial components is from >0 to about 1 wt %.

Generally speaking, the glasses described herein do not need fining agents. However, the glass or glass ceramic may further include a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 wt %. In some embodiments, the fining agent amount is from >0 to about 3 wt %. Chemical fining agents may also include $CeO_2$, $Fe_2O_3$, and other oxides of transition metals, such as $MnO_2$. These oxides may introduce unwanted color to the glass or glass ceramic via visible absorptions in their final valence state(s) in the glass, and thus, when present, their concentration is usually kept at a level of 0.5, 0.4, 0.3, 0.2, 0.1 or >0 wt %.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, color, or forming attributes. The glass can comprise from 0 to about 3 wt %, 0 to about 2 wt %, 0 to about 1 wt %, 0 to 0.5 wt %, or 0 to 0.1 wt % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise 0 wt % of $Sb_2O_3$ or $As_2O_3$ or a combination thereof, or the glass may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 wt % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass can comprise from 0 to about 3 wt %, 0 to about 2 wt %, 0 to about 1 wt %, 0 to 0.5 wt %, 0 to 0.1 wt %, 0 to 0.05 wt %, or 0 to 0.01 wt % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$ or combinations thereof.

In some embodiments, the glasses described herein can be manufactured into sheets via processes, including but not limited to, slot draw, float, rolling, and other sheet-forming processes known to those skilled in the art. Alternatively, glass compositions may be formed via float or rolling processes known in the art.

To be compatible with float-type forming processes, the glass compositions described herein can have high liquidus viscosity. In some embodiments, the glass composition can have a liquidus viscosity of from about 1500 P to about 3000 P. In some embodiments, the glass composition can have a liquidus viscosity of about 1000, 1200, 1500, 2000, 2500, or 3000 P.

In some embodiments, the glass can have a coefficient of thermal expansion of about $50\times10^{-7}$ or greater, about $50\times10^{-7}$ or greater, about $60\times10^{-7}$ or greater, about $61\times10^{-7}$ or greater, about $62\times10^{-7}$ or greater, about $63\times10^{-7}$ or greater, about $64\times10^{-7}$ or greater, about $65\times10^{-7}$ or greater, about $66\times10^{-7}$ or greater, about $67\times10^{-7}$ or greater, about $68\times10^{-7}$ or greater, about $69\times10^{-7}$ or greater, about $70\times10^{-7}$ or greater, about $71\times10^{-7}$ or greater, about $72\times10^{-7}$ or greater, about $73\times10^{-7}$ or greater, about $74\times10^{-7}$ or greater, about $75\times10^{-7}$ or greater, about $76\times10^{-7}$ or greater, about $77\times10^{-7}$ or greater, about $78\times10^{-7}$ or greater, about $79\times10^{-7}$ or greater, or about $80\times10^{-7}$ or greater.

The glass formed from the glasses and glass ceramics described herein can be any thickness that is reasonably useful. Glass sheet and/or glass ceramic embodiments may have a thickness anywhere from about 0.8 mm to about 10 mm. Some embodiments have thickness of about 6 mm or less, about 5 mm or less, about 3 mm or less, about 1.0 mm or less, about 750 μm or less, about 500 μm or less, or about 250 μm or less. Some glass sheet embodiments may have thickness of from about 200 μm to about 5 mm, about 500 μm to about 5 mm, about 200 μm to about 4 mm, about 200 μm to about 2 mm, about 400 μm to about 5 mm, or about 400 μm to about 2 mm. In some embodiments, the thickness may be from about 3 mm to about 6 mm or from about 0.8 mm to about 3 mm.

In some embodiments, the glass ceramic has an equibiaxial flexural strength of greater than 100 MPa. This ROR strength is measured according the procedure set forth in ASTM: C1499-05. Some embodiments also include a chemically-strengthenable β-spodumene phase that leads to increased flexural strength.

Some embodiments of the glass ceramics exhibit high fracture toughness and an inherent damage resistance. As mentioned above, some embodiments of the glass ceramic include interlocking lithium disilicate crystals, which result in a high fracture toughness. The glass ceramic of one or more embodiment may include boron, which may be present as three-coordinated boron in the residual glass phase of the glass ceramic. In such embodiments, the three-coordinated boron is provided by the inclusion of $B_2O_3$ in the precursor glass. The three-coordinated boron provides a densification mechanism when the glass or glass ceramic is subjected to an indentation load.

In one or more embodiments, the presence of a $B_2O_3$-containing residual glass reduces the viscosity of the precursor glass (during formation and during the heat treatment process), which allows growth of the lithium disilicate crystals. In other embodiments, the presence of a $B_2O_3$-containing residual glass also reduces the size of the β-spodumene crystals. The growth of lithium disilicate crystals and the reduced size β-spodumene crystals provide increased mechanical performance, in terms of fracture toughness values and/or Vickers indentation crack initiation values are increased by the residual glass composition and specifically, the presence of three-coordinated boron in the composition and in the glass phase.

In one or more embodiments, the glass ceramics exhibit a fracture toughness of about 2.0 MPa·m$^{1/2}$ or greater, about 2.1 MPa·m$^{1/2}$ or greater, 2.2 MPa·m$^{1/2}$ or greater, 2.3 MPa·m$^{1/2}$ or greater, 2.4 MPa·m$^{1/2}$ or greater. In some embodiments, the fracture toughness is in the range from about 2.2 to about 3.5 MPa·m$^{1/2}$, from about 2.4 to about 3.5 MPa·m$^{1/2}$, from about 2.4 to about 3.4 MPa·m$^{1/2}$, from about 2.4 to about 3.3 MPa·m$^{1/2}$, from about 2.4 to about 3.2 MPa·m$^{1/2}$, from about 2.4 to about 3.1 MPa·m$^{1/2}$, from about 2.4 to about 3.0 MPa·m$^{1/2}$, from about 2.6 to about 3.5 MPa·m$^{1/2}$, from about 2.8 to about 3.5 MPa·m$^{1/2}$, from about 3.0 to about 3.5 MPa·m$^{1/2}$, from about 2.4 to about 2.6 MPa·m$^{1/2}$, from about 2.6 to about 3.0 MPa·m$^{1/2}$, or from about 3.2 to about 3.5 MPa·m$^{1/2}$. The fracture toughness values of the glass ceramics is due to the formation of a unique microstructure of interlocking blades (or rods) of lithium disilicate crystals and irregular crystals of β-spodumene. The fracture toughness may be measured using known methods in the art, for example, using a chevron notch, short bar, notched beam and the like, according to ASTM C1421-10, "Standard Test Methods for Determination of Fracture Toughness of Advanced Ceramics at Ambient Temperature".

In one or more embodiments, the glass ceramics have high crack resistance by exhibiting a Vickers indentation crack initiation load in the range from about 15 kgf to about 30 kgf. In some embodiments, the glass ceramic exhibits a Vickers indentation crack initiation load in the range from about 16 to about 30 kgf, from about 18 to about 30 kgf, from about 20 to about 30 kgf, from about 22 to about 30 kgf, from about 15 to about 28 kgf, from about 15 to about 26 kgf, from about 15 to about 24 kgf, from about 15 to about 22 kgf, from about 15 to about 20 kgf, or from about 15 to about 18 kgf. Vickers indentation crack initiation load may be measured using ASTM C1326 and C1327 (and its progeny, all herein incorporated by reference) "Standard Test Methods for Vickers Indentation Hardness of Advanced Ceramics," ASTM International, Conshohocken, Pa., US. In some embodiments, the glass ceramics exhibit such Vickers indentation crack initiation load values after being chemically strengthened via ion exchange. In more particular embodiments, the glass ceramic exhibits a Vickers indentation crack initiation load in the range from about 15 to about 20 kgf after ion exchanging in a NaNO3 salt bath. As will be illustrated in the Examples, the high Vickers indentation crack initiation load values exhibited by the glass ceramic may be due to a densification (or compaction) mechanism when a Vickers indenter is applied to the glass ceramic.

In addition, all of the compositions and glasses and/or glass ceramics such compositions are ion exchangeable by those methods widely known in the art. In typical ion exchange processes, smaller metal ions in the glass are replaced or "exchanged" by larger metal ions of the same valence within a layer that is close to the outer surface of the glass and/or glass ceramic. The replacement of smaller ions with larger ions creates a compressive stress within the layer of the glass and/or glass ceramic. In one embodiment, the metal ions are monovalent alkali metal ions (e.g., Na+, K+, Rb+, and the like), and ion exchange is accomplished by immersing the glass and/or glass ceramic in a bath comprising at least one molten salt of the larger metal ion that is to replace the smaller metal ion in the glass. Alternatively, other monovalent ions such as Ag+, Tl+, Cu+, and the like may be exchanged for monovalent ions. The ion exchange process or processes that are used to strengthen the glass and/or glass ceramic can include, but are not limited to, immersion in a single bath or multiple baths of like or different compositions with washing and/or annealing steps between immersions. In one or more embodiments, the glasses and/or glass-ceramics may be ion exchanged by exposure to molten NaNO$_3$. In such embodiments, the Na+ ions replace some portion of the Li ions in the glass ceramic to develop a surface compressive stress layer and exhibit high crack resistance. The resulting compressive stress layer may have a depth (also referred to as a "depth of layer") of at least 20 μm on the surface of the glass and a maximum compressive stress of at least about 100 MPa, at least about 200 MPa, at least about 300 MPa or at least about 350 MPa. In other examples, embodiments may be ion exchanged by exposure to molten KNO$_3$ at a temperature of 410° C. for 8 hours to produce a compressive stress layer having a depth of layer of at least about 20 μm. In other embodiments the glasses are ion exchanged to achieve a central tension of at least 10 MPa. Chemically strengthened glass ceramics of some embodiments include a surface compressive stress layer is created that is created by the substitution of the Li contained in a glass surface with Na, which has a larger ionic radius. In such embodiments, the glass ceramic may exhibit a depth-of-layer, determined from the Na$_2$O concentration profile, in the range of 60-100 μm. In one embodiment, the temperature of the molten salt bath is about 390° C. and the predetermined time period is about one to four hours. The development of this surface compression layer is beneficial for achieving a better crack resistance and higher flexural strength compared to non-ion-exchanged materials.

In one or more embodiments, the processes for making the glass ceramic includes heat treating the precursor glasses at one or more preselected temperatures for one or more preselected times to induce crystallization (i.e., nucleation and growth) of one or more crystalline phases (e.g., having one or more compositions, amounts, morphologies, sizes or size distributions, etc.). In one or more specific embodiments, the heat treatment can include (i) heating precursor glasses at a rate of 1-10° C./min to a nucleation temperature (Tn) in the range from about 600° C. to about 810° C. (e.g., 630° C. to 725° C.); (ii) maintaining the crystallizable glasses at the nucleation temperature for a time in the range from between about ¼ hr to about 4 hr to produce nucleated crystallizable glasses; (iii) heating the nucleated crystallizable glasses at a rate in the range from about 1° C./min to about 10° C./min to a crystallization temperature (Tc) in the range from about 675° C. to about 1000° C. (e.g., from about 700° C. to about 850° C.); (iv) maintaining the nucleated crystallizable glasses at the crystallization temperature for a time in the range from about ¼ hr to about 4 hr to produce the glass ceramic described herein; and (v) cooling the formed glass ceramic to room temperature. As used herein, the term crystallization temperature may be used interchangeably with ceram or ceramming temperature. In addition, the terms "ceram" or "ceramming" may be used to refer to steps (iii), (iv) and optionally (v), collectively.

Temperature-temporal profile of heat treatment steps (iii) and (iv), in addition to precursor glass compositions, are judiciously prescribed so as to produce one or more of the following desired attributes: crystalline phase(s) of the glass ceramic, proportions of one or more major crystalline phases and/or one or more minor crystalline phases and residual glass, crystal phase assemblages of one or more predominate crystalline phases and/or one or more minor crystalline phases and residual glass, and grain sizes or grain size distributions among one or more major crystalline phases and/or one or more minor crystalline phases, which in turn may influence the final integrity, quality, color, and/or opacity, of resultant formed glass ceramic.

The resultant glass ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously.

In yet other embodiments, the precursor glass compositions used to form the glass ceramic can be formulated, for example, so that the glass ceramic is capable of being chemically strengthened using one or more ion exchange techniques. In these embodiments, ion exchange can occur by subjecting one or more surfaces of such glass ceramic to one or more ion exchange baths, having a specific composition and temperature, for a specified time period to impart to the one or more surfaces with compressive stress layer(s). The compressive stress layer can include one or more average surface compressive stress (CS), and/or one or more depths of layer.

EXAMPLES

Efforts have been made to ensure accuracy with respect to numbers (e.g., amounts, temperature, etc.) but some errors and deviations should be accounted for. Unless indicated otherwise, temperature is in OC or is at ambient temperature, and pressure is at or near atmospheric. The compositions themselves are given in wt % on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example glass and glass ceramic compositions (in terms of wt %) and properties are set forth in the Table 3 and were determined in accordance with techniques conventional in the glass art. Glasses are melted at temperatures of 1400-1500° C. and annealed at 450-500° C. The linear coefficient of thermal expansion (CTE) was done using ASTM E228-85 over the temperature range 25-300° C. is expressed in terms of x $10^{-7}/°$ C. The density in terms of grams/cm$^3$ was measured via the Archimedes method (ASTM C693). The melting temperature in terms of ° C. (defined as the temperature at which the glass melt demonstrates a viscosity of 400 poises) was calculated employing a Fulcher equation fit to high temperature viscosity data measured via rotating cylinders viscometry (ASTM C965-81).

$T_{liq}$(° C.) is the liquidus temperature—the temperature where the first crystal is observed in a standard gradient boat liquidus measurement (ASTM C829-81). This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The liquidus viscosity in poises was determined from the liquidus temperature and the coefficients of the Fulcher equation.

Figure 4:
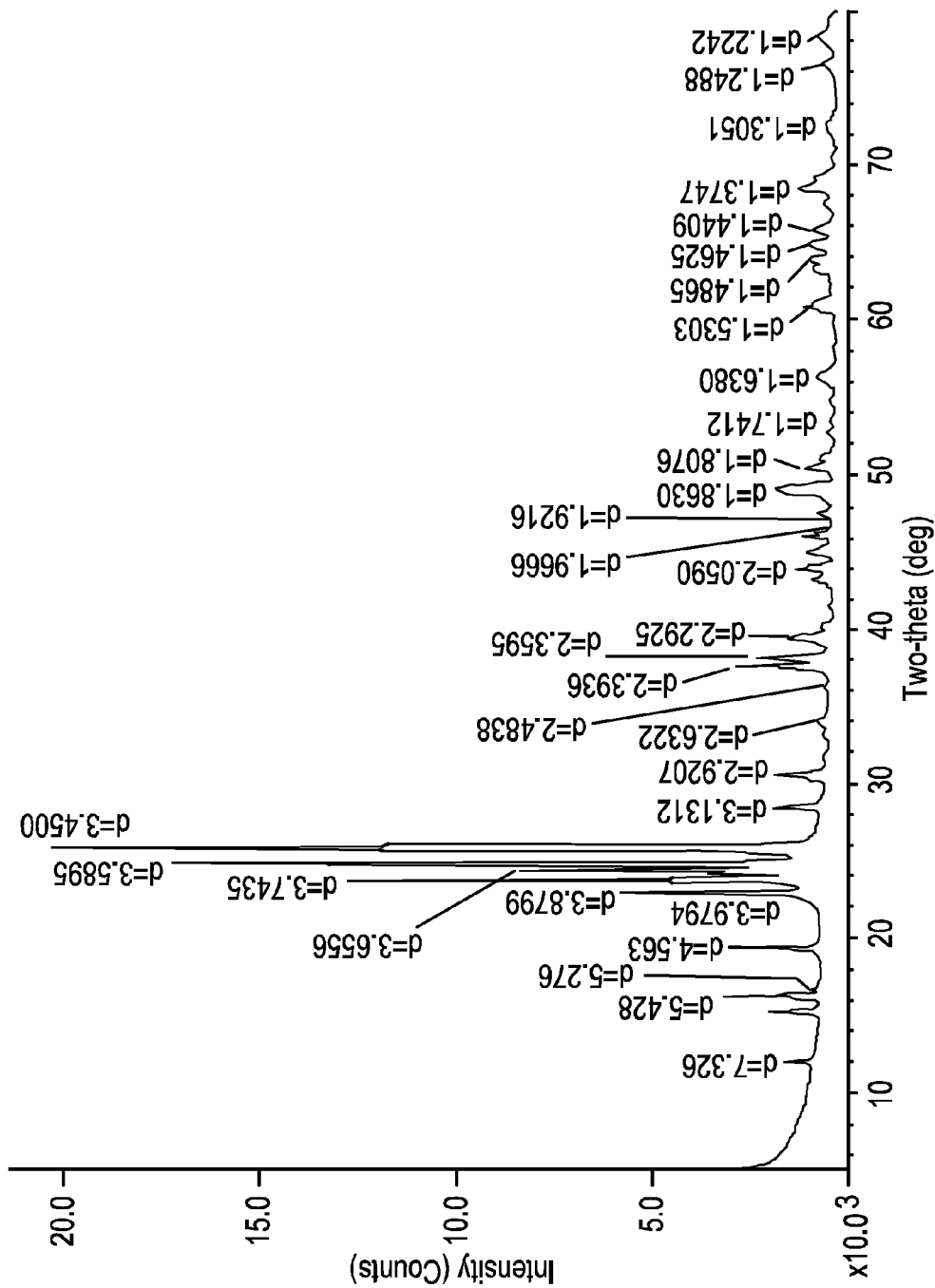
FIG. 4 shows a X-ray powder diffraction pattern of composition MX, heat treated at 650° C. for two hours and at 850° C. for four hours. Phase assemblage consists of lithium disilicate, ⍰-spodumene solid solution, $Li_3PO_4$, and a small amount of residual glass.

Heat treatment schedules typically comprised a nucleation hold or slow ramp at temperatures 600-780° C. and crystallization temperatures of 725-975° C. Unless specified otherwise, the ramp rate was about 5° C./minute. In Examples 1-23, the nomenclature "650-2" indicates a nucleation hold at 650° C. for 2 hours and nomenclature "725-4", "825-4" and "850-4" indicates crystallization at 725° C., 825° C. or 850° C., respectively, for 4 hours. In Example B, the nomenclature "780-2" indicates a nucleation hold at 780° C. for 2 hours and the nomenclature "975-4" indicates crystallization at 975° C. for 4 hours. In Examples 24-33, the nomenclature "700-2" indicates a nucleation hold at 700° C. for 2 hours and the nomenclature "825-4" indicates crystallization at 825° C. for 4 hours. As temperature increases, the first phase to crystallize is the nucleating agent lithium metaphosphate, $Li_3PO_4$, which then nucleates lithium metasilicate $Li_2SiO_3$ (FIG. 4).

TABLE 3

| | | | | Glass Designation | | | | |
|---|---|---|---|---|---|---|---|---|
| | A | 1 | 2 | 3 | 4 | 5 | 6 | 7 |
| $SiO_2$ | 74.3 | 77.4 | 76.0 | 74.5 | 72.1 | 76.2 | 76.0 | 75.7 |
| $Al_2O_3$ | 3.6 | 9.8 | 9.6 | 10.8 | 10.6 | 9.8 | 7.8 | 6.8 |
| $Li_2O$ | 15.4 | 8.8 | 8.7 | 8.8 | 8.7 | 9.8 | 11.7 | 12.7 |
| $Na_2O$ | — | 2.0 | 1.9 | 3.9 | 3.8 | 2.2 | 2.1 | 2.1 |
| $K_2O$ | 3.3 | — | — | — | — | — | — | — |
| $P_2O_5$ | 3.4 | 2.0 | 3.8 | 2.0 | 3.8 | 2.0 | 2.4 | 2.7 |
| $ZrO_2$ | — | — | — | — | — | — | — | — |
| Glass Quality | | Clear | Sl hazy | Clear | Hazy | Transluc. opal | Transluc. opal | Hazy |
| Heat Treatment (temp-hrs) | | 650-2, 850-4 | 650-2, 850-4 | 650-2, 850-4 | 650-2, 850-4 | 700-2, 850-4 | 700-2, 850-4 | 700-2, 850-4 |
| Glass Ceramic | | White, transluc, waxy-cherty | White, waxy-cherty fracture, | White, waxy-cherty fracture, | White, waxy-cherty fracture, | White, waxy-cherty fracture, | White, waxy-cherty fracture, | White, waxy-cherty fracture, |

TABLE 3-continued

|  |  |  | fracture, glossy surface | glossy surface | glossy surface, sl. deform. | glossy surface, sl. deform. | glossy surface | glossy surface | glossy surface |
|---|---|---|---|---|---|---|---|---|---|
| Heat Treatment Glass Ceramic |  |  |  |  |  |  |  |  |  |
| $T_{liq}$ [° C.] | 1020 |  |  |  |  |  |  |  | 1045 |
| Liquidus Viscosity [kP] | 970 |  |  |  |  |  |  |  | 1775 |
| CTE [×10⁻⁷] | 80 |  |  |  |  |  |  |  |  |
| Density [g/cc] |  |  |  |  |  |  |  |  |  |
| $K_{1c}$ | 3.3 |  |  |  |  |  |  |  |  |
| MOR (ksi) | 35 |  |  |  |  |  |  |  |  |
| ROR (ksi) | 90 |  |  |  |  |  |  |  |  |
| aROR (ksi) | 25 |  |  |  |  |  |  |  |  |
| Knoop Hardness (KHN/200) | 640 |  |  |  |  |  |  |  |  |

| | Glass Designation | | | | | | | |
|---|---|---|---|---|---|---|---|---|
| | 8 | 9 | 10 (KY) | 11 (MX) | 12 | 13 | 14 | 15 |
| SiO₂ | 75.6 | 75.4 | 76.4 | 76.7 | 75.3 | 77.6 | 77.1 | 77.9 |
| Al₂O₃ | 9.7 | 7.8 | 7.3 | 7.4 | 5.8 | 8.9 | 7.3 | 6.9 |
| Li₂O | 9.7 | 11.6 | 12.2 | 12.2 | 13.5 | 10.8 | 12.0 | 11.6 |
| Na₂O | 2.1 | 2.1 | 1.7 | 1.7 | 2.1 | 1.2 | 1.6 | 1.6 |
| K₂O | — | — | — | — | — | — | — | — |
| P₂O₅ | 2.9 | 3.1 | 2.4 | 2.0 | 3.3 | 1.5 | 2.0 | 2.0 |
| ZrO₂ | — | — | — | — | — | — | — | — |
| Glass Quality | Clear | Some haze | Some haze | Clear | Clear | Clear | Clear | Clear |
| Heat Treatment (temp-hrs) | 700-2, 850-4 | 700-2, 850-4 | 700-2, 850-4 | 650-2, 850-4 | 650-2, 850-4 | 600-2, 850-4 | 650-2, 850-4 | 650-2, 850-4 |
| Glass Ceramic | White, waxy-cherty fracture, glossy surface | White, waxy-cherty fracture, matte surface | White, waxy-cherty fracture, glossy surface | White, waxy-cherty fracture, glossy surface | White, waxy-cherty fracture, glossy surface | White, waxy-cherty fracture, glossy surface | White, waxy-cherty fracture, glossy surface | White, waxy-cherty fracture, glossy surface |
| Heat Treatment Glass Ceramic |  |  | 650-2, 800-4 White, waxy-cherty fracture, high gloss surface | 650-2, 725-4 White, transluc. waxy-cherty fracture, high gloss surface |  |  |  |  |
| $T_{liq}$ [° C.] |  |  | 1055 | 1030 |  |  | 1015 | 1060 |
| Liquidus Viscosity [kP] |  |  | 2100 | 3000 |  |  |  |  |
| CTE [×10⁻⁷] |  |  |  | 65 |  |  |  |  |
| Density [g/cc] |  |  |  | 2.430 |  |  |  |  |
| $K_{1c}$ |  |  | 2.7 |  |  |  |  |  |
| MOR |  |  |  |  |  |  |  |  |
| ROR |  |  |  |  |  |  |  |  |
| aROR |  |  |  |  |  |  |  |  |
| Knoop Hardness (KHN/200) |  |  |  |  |  |  |  |  |

| | Glass Designation | | | | | | | |
|---|---|---|---|---|---|---|---|---|
| | 16 | 17 | 18 | 19 | 20 | 21 | 22 | 23 |
| SiO₂ | 78.9 | 79.9 | 71.8 | 73.9 | 76.7 | 76.5 | 75.5 | 77.2 |
| Al₂O₃ | 6.6 | 6.3 | 6.9 | 7.1 | 8.8 | 7.3 | 11.8 | 9.3 |
| Li₂O | 11.0 | 10.5 | 11.5 | 11.8 | 10.7 | 12.2 | 9.8 | 11.5 |
| Na₂O | 1.5 | 1.3 | 1.5 | 1.6 | — | 1.0 | 1.0 | — |

TABLE 3-continued

| | | | | | | | | |
|---|---|---|---|---|---|---|---|---|
| $K_2O$ | — | — | — | — | 2.3 | 1.0 | — | — |
| $P_2O_5$ | 2.0 | 2.0 | 1.8 | 0.9 | 1.5 | 2.0 | 2.0 | 2.0 |
| $ZrO_2$ | — | — | 4.6 | 4.7 | — | | | |
| Glass Quality | Clear | Clear | Clear | Clear | | | | |
| Heat Treatment (temp-hrs) | 650-2, 850-4 | 650-2, 850-4 | 650-2, 850-4 | 650-2, 850-4 | | | | |
| Glass Ceramic | White, waxy-cherty fracture, glossy surface | | | | | | | |
| Heat Treatment Glass Ceramic | | | | | | | | |
| $T_{liq}$ [° C.] | 1140 | 1195 | | | | | | |
| Liquidus Viscosity [kP] | | | | | | | | |
| CTE [×10⁻⁷] | | | | | | | | |
| Density [g/cc] | | | | | | | | |
| $K_{1c}$ | | | | | | | | |
| MOR | | | | | | | | |
| ROR | | | | | | | | |
| aROR | | | | | | | | |
| Knoop Hardness (KHN/200) | | | | | | | | |

| | Glass Designation | | | | | | |
|---|---|---|---|---|---|---|---|
| | B | 24 | 25 | 26 | 27 | 28 | 29 |
| $SiO_2$ | 65.1 | 76.7 | 74.9 | 73.1 | 71.5 | 69.9 | 68.3 |
| $Al_2O_3$ | 20.1 | 7.4 | 7.2 | 7.0 | 6.8 | 6.7 | 6.6 |
| $B_2O_3$ | 2.0 | 0.0 | 2.4 | 4.7 | 6.8 | 8.9 | 10.9 |
| $Na_2O$ | 0.4 | 1.6 | 1.6 | 1.6 | 1.7 | 1.5 | 1.5 |
| $Li_2O$ | 3.6 | 12.3 | 12.0 | 11.7 | 11.4 | 11.2 | 10.9 |
| MgO | 1.8 | 0 | 0 | 0 | 0 | 0 | 0 |
| ZnO | 2.2 | 0 | 0 | 0 | 0 | 0 | 0 |
| $TiO_2$ | 4.4 | 0 | 0 | 0 | 0 | 0 | 0 |
| $P_2O_5$ | 0 | 2.0 | 1.9 | 1.9 | 1.8 | 1.8 | 1.8 |
| Glass Quality | | | | | | | |
| Heat Treatment (temp-hrs) | 780-2 975-4 | 700-2 825-4 | 700-2 825-4 | 700-2 825-4 | 700-2 825-4 | 700-2 825-4 | 700-2 825-4 |
| Glass Ceramic Heat Treatment Glass Ceramic | | | | | | | |
| $T_{liq}$ [° C.] | 1245 | 1010 | 1020 | 1020 | | | |
| Liquidus Viscosity [kP] | 15,000 | 3,500 | 1,900 | 1,300 | | | |
| CTE [×10⁻⁷] | | | | | | | |
| Density [g/cc] | | | | | | | |
| $K_{1c}$ | | | | | | | |
| MOR | | | | | | | |
| ROR | | | | | | | |
| aROR | | | | | | | |
| Knoop Hardness (KHN/200) | | | | | | | |
| Fracture Toughness (MP·m^{1/2}) | 0.9 | 1.6 | 2.4 | 2.6 | | | |

TABLE 3-continued

| | Glass Designation | | | | | | |
|---|---|---|---|---|---|---|---|
| | 30 | 31 | 32 | 33 | 34 | 35 | 36 |
| SiO$_2$ | 71.7 | 70.3 | 68.9 | 73.1 | 73.1 | 74.5 | 74.5 |
| Al$_2$O$_3$ | 7.4 | 7.8 | 8.2 | 8.4 | 9.8 | 10.0 | 10.0 |
| B$_2$O$_3$ | 4.9 | 5.2 | 5.5 | 4.7 | 4.7 | 2.4 | 2.4 |
| Na$_2$O | 1.8 | 1.8 | 1.9 | 1.6 | 1.6 | 1.6 | 1.6 |
| Li$_2$O | 12.3 | 13.0 | 13.6 | 10.3 | 8.9 | 9.0 | 9.0 |
| MgO | 0 | 0 | 0 | 0 | 0 | | 0 |
| ZnO | 0 | 0 | 0 | 0 | 0 | 0 | 0 |
| TiO$_2$ | 0 | 0 | 0 | 0 | 0 | 0 | 0 |
| P$_2$O$_5$ | 1.9 | 1.9 | 1.9 | 1.9 | 1.9 | 2.4 | 2.4 |
| Glass Quality | | | | | | | |
| Heat Treatment (temp-hrs) | 700-2 825-4 | 700-2 825-4 | 700-2 825-4 | 700-2 825-4 | 700-2 825-4 | 700-2 825-4 | 700-2 825-4 |
| Glass Ceramic Heat Treatment | | | | | | | |
| Glass Ceramic | | | | | | | |
| T$_{liq}$ [° C.] | 1020 | 1010 | 1005 | 1040 | | | |
| Liquidus Viscosity [kP] | 1,030 | 720 | — | 2070 | | | |
| CTE [×10$^{-7}$] | | | | | | | |
| Density [g/cc] | | | | | | | |
| K$_{1c}$ | | | | | | | |
| MOR | | | | | | | |
| ROR | | | | | | | |
| aROR | | | | | | | |
| Knoop Hardness (KHN/200) | | | | | | | |
| Fracture Toughness (MPa · m$^{1/2}$) | 2.1 | 3.1 | 2.8 | 2.0 | 2.2 | 2.2 | 2.2 |

| | Glass Designation | | | | | | | |
|---|---|---|---|---|---|---|---|---|
| | 37 | 38 | 39 | 40 | 41 | 42 | 43 | 44 |
| SiO$_2$ | 73.1 | 72.5 | 71.8 | 73.2 | 72.8 | 72.5 | 67.8 | 68.8 |
| Al$_2$O$_3$ | 9.8 | 9.7 | 9.6 | 9.8 | 9.8 | 9.7 | 7.7 | 7.6 |
| B$_2$O$_3$ | 2.3 | 2.3 | 2.3 | 2.3 | 2.3 | 2.3 | 5.0 | 5.1 |
| Na$_2$O | 1.6 | 1.6 | 1.6 | 1.6 | 1.6 | 1.6 | 1.7 | 1.7 |
| Li$_2$O | 8.9 | 8.8 | 8.7 | 8.9 | 8.8 | 8.8 | 12.5 | 12.7 |
| MgO | 0 | 0 | 0 | 0 | 0 | 0 | 0 | 0 |
| ZnO | 0 | 0 | 0 | 0 | 0 | 0 | 0 | 0 |
| TiO$_2$ | 1.9 | 2.8 | 3.7 | 0 | 0 | 0 | 3.6 | 0 |
| P$_2$O$_5$ | 2.3 | 2.3 | 2.3 | 2.3 | 2.3 | 2.3 | 1.8 | 1.8 |
| NiO | 0 | 0 | 0 | 0.9 | 0.9 | 0.93 | 0 | 0.91 |
| Co$_3$O$_4$ | 0 | 0 | 0 | 0.9 | 0.9 | 0.93 | 0 | 0.91 |
| Fe$_2$O$_3$ | 0 | 0 | 0 | 0 | 0.5 | 0.93 | 0 | 0.46 |
| Glass Quality | | | | | | | | |
| Heat Treatment (temp-hrs) | | | | | | | | |
| Glass Ceramic Heat Treatment | | | | | | | | |
| Glass Ceramic | | | | | | | | |
| T$_{liq}$ [° C.] | | | | | | | | |
| Liquidus Viscosity [kP] | | | | | | | | |

TABLE 3-continued

CTE [×10⁻⁷]
Density
[g/cc]
$K_{1c}$
MOR
ROR
aROR
Knoop
Hardness
(KHN/200)

The X-ray diffraction pattern for composition 11 is shown in FIG. 4. The glass-ceramic contains lithium disilicate, β-spodumene, lithium metaphosphate, and an alkali aluminosilicate residual glass. A normative calculation of composition 11 suggests it would yield a phase assemblage of:

Lithium disilicate: 47 wt %
β-spodumene: 34%
$Li_3PO_4$: 3.3%
Sodium aluminosilicate residual glass: 15.7%.

This value is consistent with the phase assemblage observed in the XRD pattern.

Glass ceramic microstructures—As seen in FIGS. 5A and 5B, the fracture surfaces of compositions A (lithium disilicate only) and 7 (lithium disilicate and β-spodumene) look very similar, as they are dominated by the fracture planes of the lithium disilicate phase. On the other hand, polished and etched surfaces, seen in FIGS. 6A and 6B, highlight the significant difference in microstructures between compositions A and 7. Both contain minor amounts of the $Li_3PO_4$ nucleation phase.

Examples 40-42 and 44 included NiO, $Co_3O_4$ and/or $Fe_2O_3$ and exhibited a black color. Examples 37-39 and 43 included $TiO_2$ and exhibited a white color.

Examples 24-29 included a $B_2O_3$ content of 0 to about 10.9 wt %. The X-ray diffraction spectra for the crystallite phases of the glass ceramics of Examples 24-29, after being subjected to the nucleation hold and crystallization conditions shown in Table 3 are shown in FIG. 7. Without being bound by theory, it is believed that limiting the content of $B_2O_3$ in the glasses and glass ceramics described herein to about 5 wt % provides a durable glass ceramic.

Figure 2:
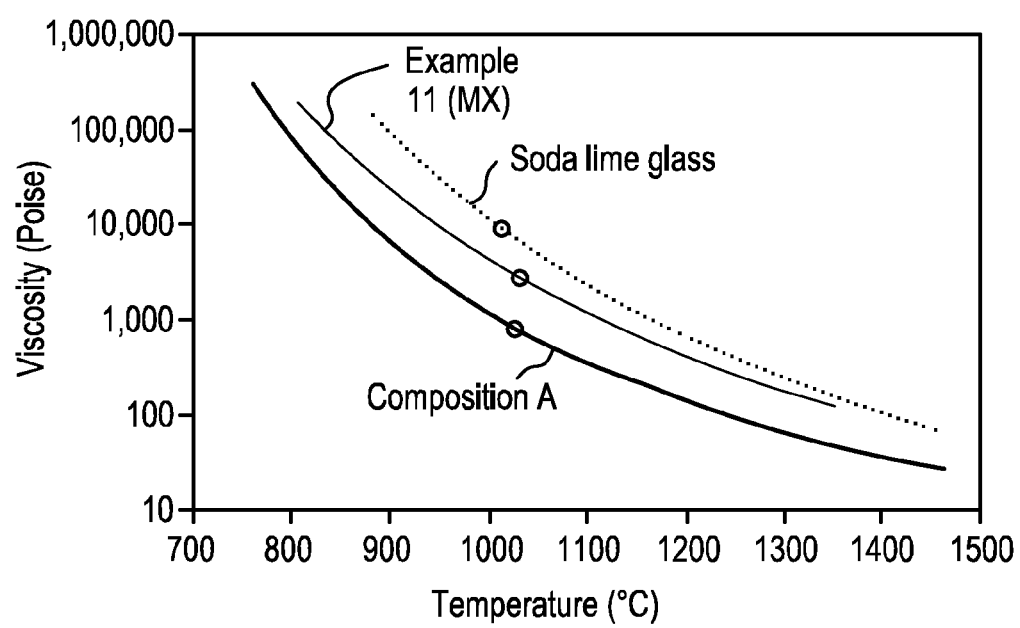
Figure 8A:
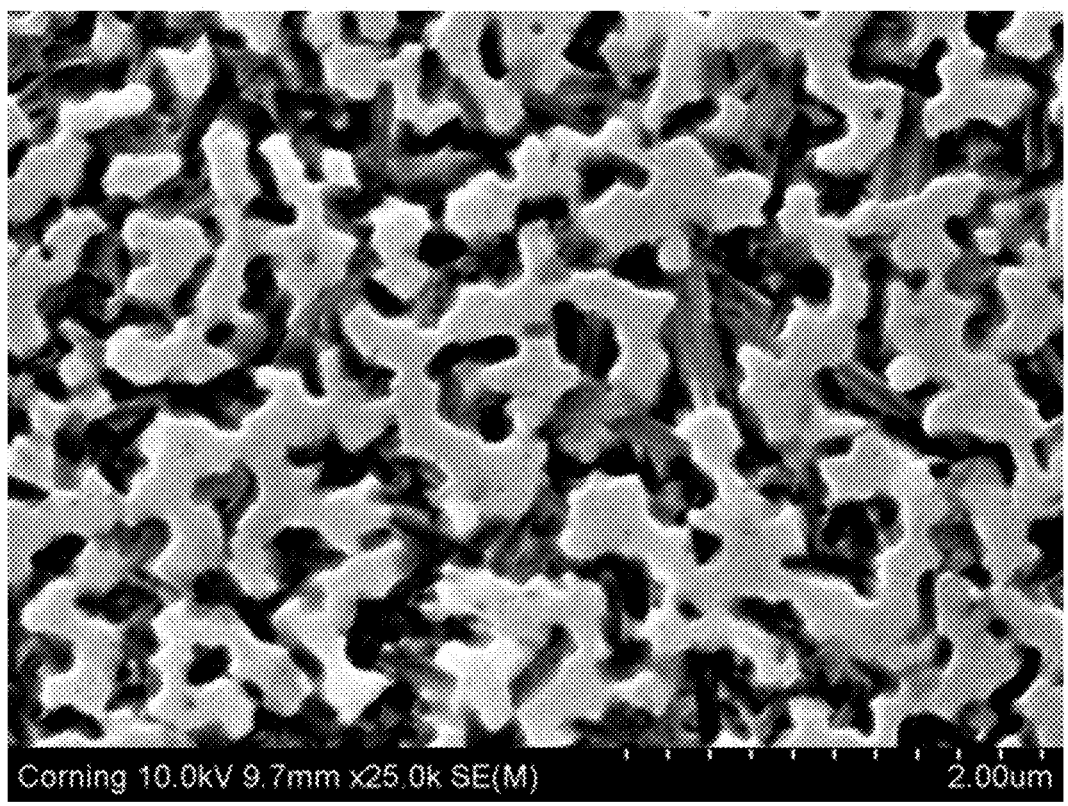
Figure 8B:
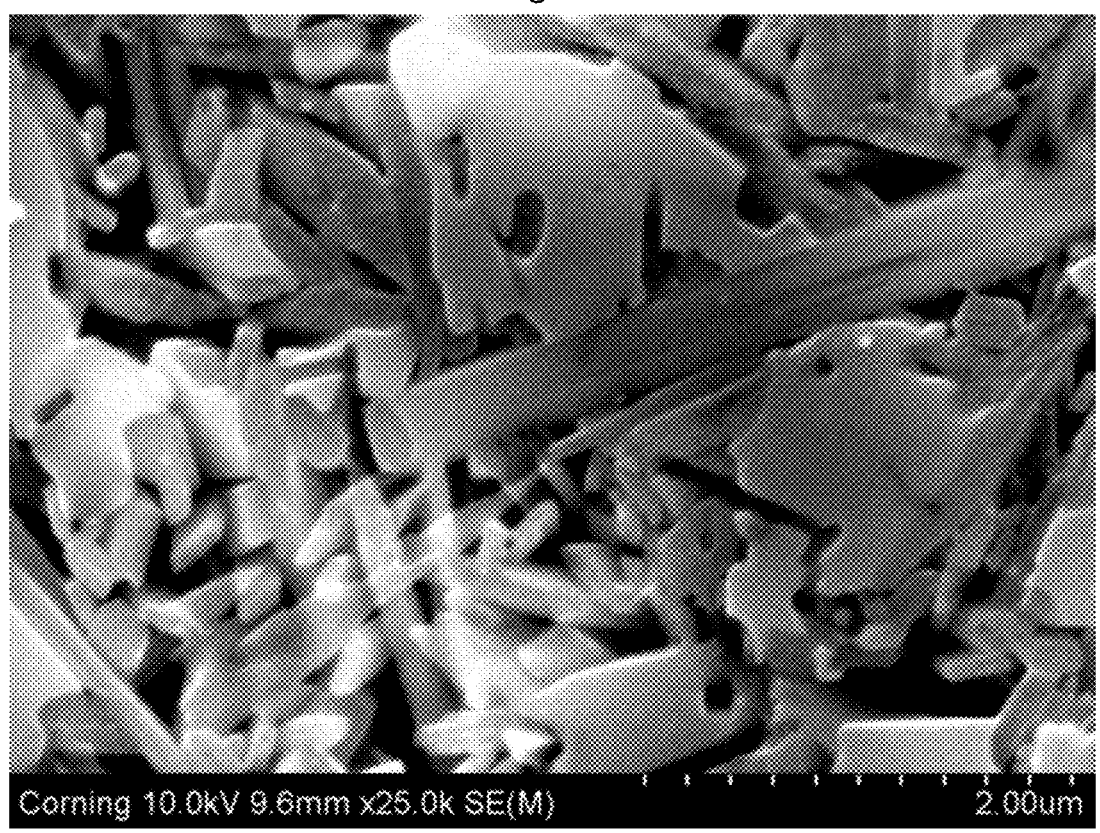
Figure 8C:
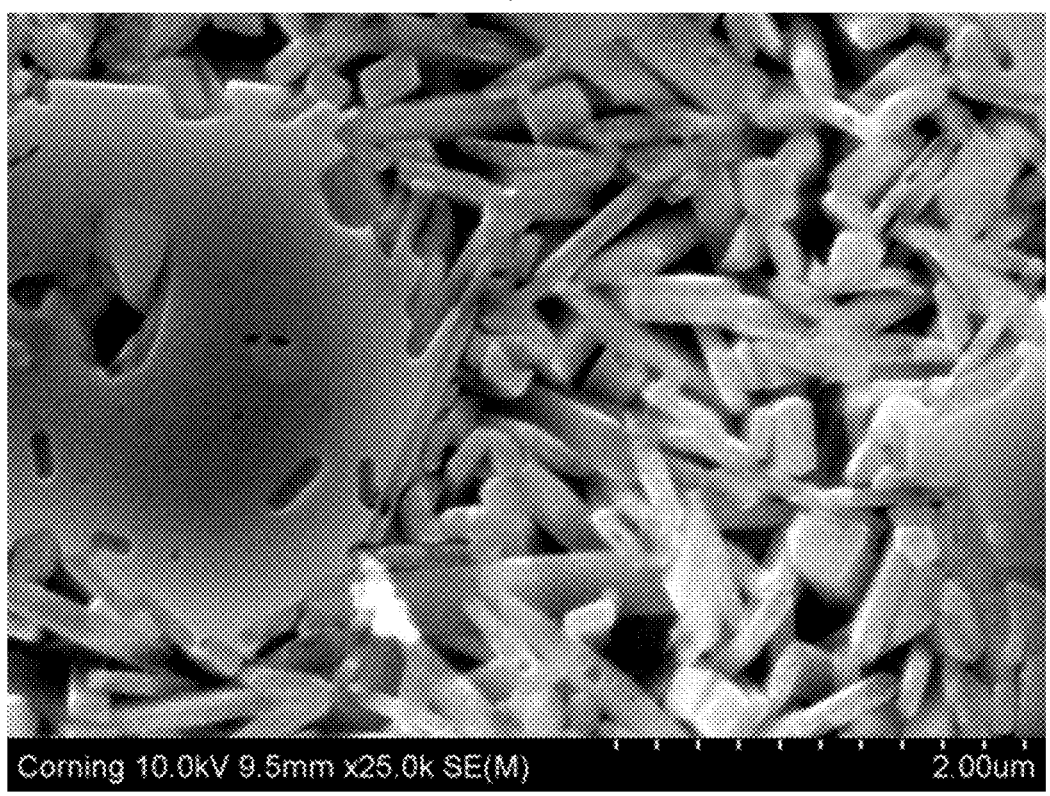
Figure 8D:
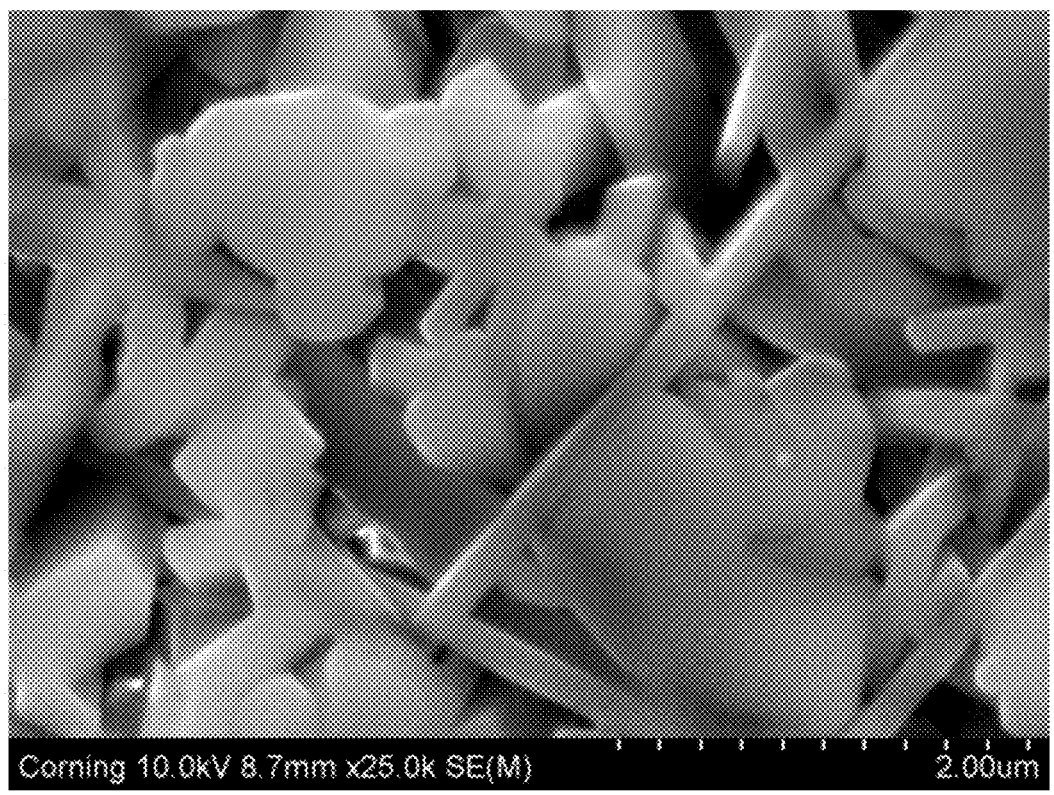

FIGS. 8A-8D show SEM images of Examples 24-27, respectively, after the glass ceramics were etched in 1% HF solution for 1 minute. The black areas in FIGS. 8A-8D indicate residual glass that has been etched away by the HF solution (the white parts are the crystalline phase). The interlocking lithium disilicate and irregular β-spodumene crystals of the glass ceramics can be seen in FIGS. 8B-8D, when compared to FIG. 8A. The resulting grain size of the lithium disilicate crystallites are believed to be about 1 μm or greater, with high aspect ratio. Such crystallites are formed where the glass ceramics (and precursor glasses) include at least 2 wt %, or at least about 2.4 wt % $B_2O_3$ (as shown in FIG. 2). Examples 25-27 included interlocking crystals and thus exhibited toughening mechanisms including crack deflection and tortuous crack path, which contributes to the observed high fracture toughness. In contrast, Example 24 exhibited a relatively low fracture toughness (about 1.6 MPa·m$^{1/2}$), which is believed to be due to the lack of interlocking large crystals (as also shown in FIG. 8A). The addition of boron to the precursor glass compositions is observed to increase the growth of lithium disilicate crystals which favors the formation of an interlocking structure.

FIG. 9 illustrates the $^{11}$Boron NMR spectra of selected glass ceramics formed from Examples 25-29 in which both three-coordinated and four-coordinated boron are detected in residual glass. As shown in FIG. 9, the sharp peak at about 2.8 ppm indicates the formation of $BO_4$ in crystalline phase and indicates an amount of $BO_4$ in the range from about 0.1 wt % to about 0.15 wt %. The absolute amount of three-coordinated boron (which is about 42 wt % of total boron) in glass-ceramics scales with increasing boron concentration in the precursor glasses. There is no detectable change in the BO3/BO4 ratio for all the glass-ceramic samples. It was observed that the Vickers indentation crack initiation load values increased due to the presence of three-coordinated boron (which appeared to promote growth of lithium disilicate crystals).

FIGS. 10-12 show optical imaging of the cross-sections of glass ceramics according to Examples 24-26, respectively. The images show the glass ceramics after indentation under a 3-kgf load using a Vickers indenter. These Examples were not chemically strengthened. FIGS. 11-12 showed increased compaction or densification, instead of cracking, which is believed to be due to the presence of three-coordinated boron. Specifically, boron in the residual glass is able to introduce an inherent damage resistance under indentation. A significant reduction of shear faults and lateral cracking along with a higher degree of densification/compaction with increasing boron in glass-ceramics are visualized in cross sections shown in FIGS. 10-12.

Examples B and 26 were chemically strengthened via an ion exchange process in which the glass ceramics of each Example were immersed in a molten $NaNO_3$ bath at a temperature of about 390° C. for 3.5 hours. FIG. 13 shows the concentration of Na+ ions, in terms of $Na_2O$ from the surface to the bulk of the glass ceramics of Examples B and 26. Based at least partly on the shapes of the curves shown in FIG. 13, the Na+ ions were exchanged with smaller ions in the β-spodumene phase. Example 26 exhibited a higher concentration of Na+ ions, which may be due to the presence of $Na_2O$ in the precursor composition. The depth of the compressive stress layer resulting from the ion exchange process may be modified to provide a deeper or shallower depth by modifying the ion exchange times, the temperature of the bath and the composition of the bath.

The glass ceramics of Examples 24-26, without being chemically strengthened, were tested to determine the Vickers indentation crack initiation load values using a Model 5948 MicroTester, available from Instron. FIG. 14 shows the Vickers indentation crack initiation load values for each of Examples 24-26. As shown in FIG. 14, Example 26, which included 4.7 wt % $B_2O_3$ (whereas Examples 24 and 25 included 0 wt % or 2.4 wt % $B_2O_3$) exhibited significantly higher Vickers indentation crack initiation load values.

The glass ceramics of Examples 24 and 26 were chemically strengthened by immersing into a molten $NaNO_3$ bath having a temperature of 390° C. for 3.5 hours. Three samples each of Examples 24 and 26 were indented using a Vickers indenter at loads of 2 kgf, 5 kgf and 10 kgf. FIGS. 15A-15F show optical microscopic images of the Vickers indentations of Examples 24 and 26 (comparing 0 wt % $B_2O_3$ with 4.7 wt % $B_2O_3$). FIGS. 15 A-C showed the Vickers indentations of Example 24 at 2 kgf, 5 kgf, and 10 kgf, respectively. FIGS. 15 D-F showed the Vickers indentations of Example 26 at 2 kgf, 5 kgf, and 10 kgf. The Vickers indentation crack initiation load values for each sample were measured using Model 5948 MicroTester, available from Instron. As shown in FIGS. 15A-15F, Example 26 exhibited significantly higher Vickers indentation crack initiation load values over Example 24.

While embodiments and examples have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass ceramic comprising:
30-65 wt % of a lithium disilicate first crystalline phase; and
20-60 wt % of a β-spodunnene second crystalline phase, wherein the glass ceramic has a composition comprising, in wt %:
$SiO_2$: 73-82%;
$Al_2O_3$: 5-12.5%;
$Li_2O$: 8-15%;
$Na_2O$: >0-5%;
$K_2O$: 0-2%;
($Na_2O+K_2O$): 0-5%;
$P_2O_5$: >0-4%;
$ZrO_2$: 0-10%; and
$TiO_2$: 0-4%.

2. The glass ceramic of claim 1, comprising:
40-55 wt % of a lithium disilicate first crystalline phase; and
25-45 wt % of a β-spodunnene second crystalline phase.

3. The glass ceramic of claim 1, wherein the residual glass phase comprises less than 25 wt %.

4. The glass ceramic of claim 1, wherein the glass ceramic has a composition comprising, in wt %:
$SiO_2$: 73-80%;
$Al_2O_3$: 6-9%;
$Li_2O$: 10-13%;
$Na_2O$: ≥0-2.5%;
$K_2O$: 0-2%;
($Na_2O+K_2O$): 1-3%;
$P_2O_5$: 1-3%;
$ZrO_2$: 0-5%; and
$TiO_2$: 0-4%.

5. The glass ceramic of claim 1, wherein the glass ceramic has a coefficient of thermal expansion greater than 5 ppm/° C.

6. The glass ceramic of claim 1, wherein the glass ceramic has a fracture toughness of about 2 MPa·m$^{1/2}$ or greater.

7. The glass ceramic of claim 1, wherein the glass ceramic has a Vickers indentation crack initiation load of about 15 kgf or greater.

8. The glass ceramic of claim 1, further comprising about 2-12% $B_2O_3$.

9. The glass ceramic of claim 1, wherein the glass-ceramic comprises a color presented in CIELAB color space coordinates determined from reflectance spectra measurements using a spectrophotometer, with illuminant D65 and specular reflectance excluded, of the following ranges:
a*=from about −1 to about +3;
b*=from about −7 to about +3; and
L*>85.

10. The glass ceramic of claim 1, wherein the glass ceramic is formed from a base glass having a liquidus viscosity greater than 1000 P.

11. The glass ceramic of claim 1, wherein the glass ceramic comprises, in wt %:
$TiO_2$: >0-3%, and
$ZrO_2$: >0-4.

12. The glass ceramic of claim 1, wherein the glass ceramic further comprises a coloring component.

13. The glass ceramic of claim 12, wherein the coloring component comprises $V_2O_5$, $Cr_2O_3$, $TiO_2$, $MnO_2$, NiO, ZnO, CuO, NiO, $Co_3O_4$, and combinations thereof.

14. The glass ceramic of claim 13, wherein the total wt % of coloring component is from >0 to about 4 wt %.

15. A method of forming a glass of claim 1, wherein the method comprises:
a. forming a glass composition,
b. ceramming the glass composition.

* * * * *

UNITED STATES PATENT AND TRADEMARK OFFICE
CERTIFICATE OF CORRECTION

| | |
|---|---|
| PATENT NO. | : 9,701,573 B2 |
| APPLICATION NO. | : 14/474708 |
| DATED | : July 11, 2017 |
| INVENTOR(S) | : George Halsey Beall et al. |

Page 1 of 1

It is certified that error appears in the above-identified patent and that said Letters Patent is hereby corrected as shown below:

In the Claims

In Column 29, Line 27, in Claim 1, delete "β-spodunnene" and insert -- β-spodumene --.

In Column 29, Line 42, in Claim 2, delete "β-spodunnene" and insert -- β-spodumene --.

Signed and Sealed this
Twenty-eighth Day of October, 2025

John A. Squires
*Director of the United States Patent and Trademark Office*